US012613148B2

(12) United States Patent
Putorti, Jr. et al.

(10) Patent No.: US 12,613,148 B2
(45) Date of Patent: Apr. 28, 2026

(54) HIGH ENERGY ARC-COMPATIBLE THERMAL CAPACITANCE SENSOR AND MEASURING HEAT FLUX AND INCIDENT ENERGY OF A HIGH ENERGY ARC EVENT

(71) Applicant: Government of the United States of America, as represented by the Secretary of Commerce, Gaithersburg, MD (US)

(72) Inventors: Anthony Demetrio Putorti, Jr., Lovettsville, VA (US); Edward Joseph Hnetkovsky, Jr., Brunswick, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 620 days.

(21) Appl. No.: 17/993,537

(22) Filed: Nov. 23, 2022

(65) Prior Publication Data
US 2024/0077368 A1 Mar. 7, 2024

Related U.S. Application Data

(60) Provisional application No. 63/403,406, filed on Sep. 2, 2022.

(51) Int. Cl.
*G01K 17/00* (2006.01)
*G01K 1/14* (2021.01)
(52) U.S. Cl.
CPC ............... *G01K 17/00* (2013.01); *G01K 1/14* (2013.01)

(58) Field of Classification Search
CPC .................................. G01K 17/00; G01K 1/14
USPC .......................................................... 374/29
See application file for complete search history.

(56) References Cited

U.S. PATENT DOCUMENTS

2014/0355643 A1* 12/2014 Sharratt ................. G01K 19/00
374/163

OTHER PUBLICATIONS

Medtherm Corporation, "Series 64, Heat Flux Transducers and Infrared Radiometers for the Direct Measurement of Heat Transfer Rates", Medtherm Catalog, 2006, p. 1-5.
Medtherm Corporation, (n.d.). Heat Flux Transducers for Arc Plasma Models. Bulletin 103.

(Continued)

*Primary Examiner* — Mirellys Jagan
(74) *Attorney, Agent, or Firm* — Office of Chief Counsel for National Institute of Standards and Technology

(57) ABSTRACT

A high energy arc-compatible thermal capacitance sensor includes a thermally capacitive slug comprising; a refractory insulation member on which the thermally capacitive slug is disposed; and a temperature reader disposed on a hidden thermal energy transfer surface of the thermally capacitive slug and in thermal communication with the hidden thermal energy transfer surface and that measures a temperature of the hidden thermal energy transfer surface, such that the temperature reader: is a refractory insulation member blocks the temperature reader from a plasma jet and heat flux and incident energy; and receives thermal energy from the hidden thermal energy transfer surface; and produces thermal energy data from the thermal energy, such that the heat flux and incident energy of the high energy arc event is determinable from the thermal energy data.

20 Claims, 22 Drawing Sheets

(56)         References Cited

OTHER PUBLICATIONS

Medtherm Corporation, (n.d.). High Temperature Heat Flux Transducers, H Series. Bulletin 187.
ASTM International, "Designation: E457—08 (Reapproved 2020), Standard Test Method for Measuring Heat-Transfer Rate Using a Thermal Capacitance (Slug) Calorimeter", 2020, p. 1-6.
ASTM International, "Designation: F1959/F1959M—14'1, Standard Test Method for Determining the Arc Rating of Materials for Clothing", 2014, p. 1-14.
Ingason, H., et al., "Measuring incident radiant heat flux using the plate thermometer", Fire Safety Journal, 2007, p. 161-166, vol. 42.
Keltner, N.R., et al., "Using Directional Flame Thermometers for Measuring Thermal Exposure", Journal of ASTM International, 2010, p. 1-12, vol. 7, No. 2.
Medtherm Corporation, "Heat Flux Transducers and Infrared Radiometers for the Direct Measurement of Heat Transfer Rates", 64 Series Heat Flux Transducers, 2006, p. 1-5.

* cited by examiner (A)

(B)

Exemplary dimensions tolerance'
1.000 dia +/- 0.001'
15mm depth +/- 0.001'
0.750 dia +/- 0.010'
0.250 dia +/- 0.010'
0.250 deep +/- 0.020'

Front plan view

Side view  200

Side view  200

Rear plan view  200

Perspective view  200

Rear view of 200 with
thermally capacitive slug
removed from slug receptacle

Fasteners

Perspective view of thermally
capacitive slug, temperature
reader, and other elements Side view of thermally
capacitive slug, temperature
reader, and other elements 24 AWG tinned copper shorting wire connecting all 3 phases

CABINET

HIGH ENERGY ARC-COMPATIBLE THERMAL CAPACITANCE SENSOR AND MEASURING HEAT FLUX AND INCIDENT ENERGY OF A HIGH ENERGY ARC EVENT

CROSS REFERENCE TO RELATED APPLICATIONS

This application claims the benefit of U.S. Provisional Patent Application Ser. No. 63/403,406 (filed Sep. 2, 2022), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a high energy arc-compatible thermal capacitance sensor for measuring heat flux and incident energy of a high energy arc event, the high energy arc-compatible thermal capacitance sensor comprising: a thermally capacitive slug comprising: a refractory metal that nondestructively withstands changes in shape, volume, and mass while being subjected to a plasma jet from a high energy arc event for a duration of exposure time of at least 8 seconds and at least 10,000° C.; an exposed high energy arc receiver surface that receives heat flux and incident energy from the plasma jet and produces thermal energy from receiving the heat flux and incident energy; a hidden thermal energy transfer surface arranged relative to the exposed high energy arc receiver surface so that the hidden thermal energy transfer surface is not exposed to the plasma jet and the heat flux and incident energy and so that the hidden thermal energy transfer surface receives the thermal energy from the exposed high energy arc receiver surface, wherein the thermal energy is communicated from the exposed high energy arc receiver surface to the hidden thermal energy transfer surface through the refractory metal, wherein a refractory insulation member blocks the plasma jet and the heat flux and incident energy from the hidden thermal energy transfer surface; and a mounting surface that mechanically engages a refractory insulation member such that mounting surface is interposed between the exposed high energy arc receiver surface and the hidden thermal energy transfer surface, and such that the mounting surface is not exposed to the plasma jet and the heat flux and incident energy by the refractory insulation member that blocks the mounting surface from the plasma jet and the heat flux and incident energy; the refractory insulation member on which the thermally capacitive slug is disposed and comprising: a slug receptacle bounded by a receptacle wall and that receives the thermally capacitive slug, such that the receptacle wall mechanically engages the mounting surface of the thermally capacitive slug and fixes a position of the mounting surface of the thermally capacitive slug; and an output interface aperture bounded by an aperture wall and that provides communication between a temperature reader disposed on the hidden thermal energy transfer surface of the thermally capacitive slug and a thermal energy analyzer, such that thermal energy data is communicable from the temperature reader to the thermal energy analyzer; and the temperature reader disposed on the hidden thermal energy transfer surface of the thermally capacitive slug and in thermal communication with the hidden thermal energy transfer surface and that measures a temperature of the hidden thermal energy transfer surface, such that the temperature reader: is not exposed to the plasma jet and the heat flux and incident energy by the refractory insulation member that blocks the temperature reader from the plasma jet and the heat flux and incident energy; and receives the thermal energy from the hidden thermal energy transfer surface; produces the thermal energy data from the thermal energy, such that the heat flux and incident energy of the high energy arc event is determinable from the thermal energy data.

Disclosed is a high energy arc-compatible thermal capacitance sensor for measuring heat flux and incident energy of a high energy arc event, the high energy arc-compatible thermal capacitance sensor comprising: a thermally capacitive slug comprising: a refractory metal that nondestructively withstands changes in shape, volume, and mass while being subjected to a plasma jet from a high energy arc event for a duration of exposure time of at least 8 seconds and at least 10,000° C.: an exposed high energy arc receiver surface that receives heat flux and incident energy from the plasma jet and produces thermal energy from receiving the heat flux and incident energy; a hidden thermal energy transfer surface arranged relative to the exposed high energy arc receiver surface so that the hidden thermal energy transfer surface is not exposed to the plasma jet and the heat flux and incident energy and so that the hidden thermal energy transfer surface receives the thermal energy from the exposed high energy arc receiver surface; wherein the thermal energy is communicated from the exposed high energy arc receiver surface to the hidden thermal energy transfer surface through the refractory metal, wherein a refractory insulation member blocks the plasma jet and the heat flux and incident energy from the hidden thermal energy transfer surface; a mounting surface that mechanically engages a refractory insulation member such that mounting surface is interposed between the exposed high energy arc receiver surface and the hidden thermal energy transfer surface, and such that the mounting surface is not exposed to the plasma jet and the heat flux and incident energy by the refractory insulation member that blocks the mounting surface from the plasma jet and the heat flux and incident energy; and a fastener receiver arranged proximate to the hidden energy transfer surface and that receives a fastener that fastens the temperature reader to the thermally capacitive slug the refractory insulation member on which the thermally capacitive slug is disposed and comprising: a ceramic that electrically insulates the hidden thermal energy transfer surface, the thermally capacitive slug, and the temperature reader from the heat flux and incident energy of the high energy arc event; a slug receptacle bounded by a receptacle wall and that receives the thermally capacitive slug, such that the receptacle wall mechanically engages the mounting surface of the thermally capacitive slug and fixes a position of the mounting surface of the thermally capacitive slug; an output interface aperture bounded by an aperture wall and that provides communication between a temperature reader disposed on the hidden thermal energy transfer surface of the thermally capacitive slug and a thermal energy analyzer, such that thermal energy data is communicable from the temperature reader to the thermal energy analyzer; and a mounting member to mount the high energy arc-compatible thermal capacitance sensor to a support structure; the temperature reader disposed on the hidden thermal energy transfer surface of the thermally capacitive slug and in thermal communication with the hidden thermal energy transfer surface and that measures a temperature of the hidden thermal energy transfer surface, such that the temperature reader: comprises a thermocouple; a resistance temperature detector, a thermometer, a thermistor, or a combination comprising at least one of the foregoing temperature readers; is not exposed to the plasma jet and the heat flux and incident energy by the refractory insulation member that blocks the temperature reader from the plasma jet and the heat flux and incident energy; and receives the thermal energy from the hidden thermal energy transfer surface; produces the thermal energy data from the thermal energy, such that the heat flux and incident energy of the high energy arc event is determinable from the thermal energy data; the fastener disposed on the thermally capacitive slug that is received by the fastener receiver and that that fastens the temperature reader to the thermally capacitive slug; an electrically insulating spacer interposed between the fastener and the temperature reader and that comprises a ceramic paper washer that electrically insulates the fastener and the temperature reader; and a mechanical load distributor interposed between the fastener and the electrically insulating spacer.

Disclosed is a process for measuring heat flux and incident energy of a high energy arc event with a high energy arc-compatible thermal capacitance sensor, the process comprising: receiving, by an exposed high energy arc receiver surface of the high energy arc-compatible thermal capacitance sensor, heat flux and incident energy from a plasma jet of a high energy arc event, the high energy arc-compatible thermal capacitance sensor comprising: a thermally capacitive slug comprising: a refractory metal that nondestructively withstands changes in shape, volume, and mass while being subjected to the plasma jet from the high energy arc event for a duration of exposure time of at least 8 seconds and at least 10000° C.; the exposed high energy arc receiver surface that receives the heat flux and incident energy from the plasma jet; a hidden thermal energy transfer surface arranged relative to the exposed high energy arc receiver surface so that the hidden thermal energy transfer surface is not exposed to the plasma jet and the heat flux and incident energy; and a mounting surface that mechanically engages a refractory insulation member such that mounting surface is interposed between the exposed high energy arc receiver surface and the hidden thermal energy transfer surface, and such that the mounting surface is not exposed to the plasma jet and the heat flux and incident energy by the refractory insulation member that blocks the mounting surface from the plasma jet and the heat flux and incident energy; the refractory insulation member on which the thermally capacitive slug is disposed and comprising: a slug receptacle bounded by a receptacle wall and that receives the thermally capacitive slug, such that the receptacle wall mechanically engages the mounting surface of the thermally capacitive slug and fixes a position of the mounting surface of the thermally capacitive slug; and an output interface aperture bounded by an aperture wall and that provides communication between a temperature reader disposed on the hidden thermal energy transfer surface of the thermally capacitive slug and a thermal energy analyzer, such that thermal energy data is communicable from the temperature reader to the thermal energy analyzer; and the temperature reader disposed on the hidden thermal energy transfer surface of the thermally capacitive slug and in thermal communication with the hidden thermal energy transfer surface and that measures a temperature of the hidden thermal energy transfer surface, such that the temperature reader: is not exposed to the plasma jet and the heat flux and incident energy by the refractory insulation member that blocks the temperature reader from the plasma jet and the heat flux and incident energy; and receives the thermal energy from the hidden thermal energy transfer surface; produces the thermal energy data from the thermal energy, such that the heat flux and incident energy of the high energy arc event is determinable from the thermal energy data; producing, by the exposed high energy arc receiver surface, thermal energy from the heat flux and incident energy in response to receiving the heat flux and incident energy from the plasma jet; blocking, by the refractory insulation member, the plasma jet and the heat flux and incident energy from the hidden thermal energy transfer surface and the mounting surface of the thermally capacitive slug; communicating the thermal energy from the exposed high energy arc receiver surface to the hidden thermal energy transfer surface through the refractory metal receiving, by the hidden thermal energy transfer surface, the thermal energy from the exposed high energy arc receiver surface; communicating the thermal energy from the hidden thermal energy transfer surface to the temperature reader; receiving, by the temperature reader, the thermal energy from the hidden thermal energy transfer surface; producing, by the temperature reader, thermal energy data from the thermal energy; and determining the heat flux and incident energy of the high energy arc event from the thermal energy data.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
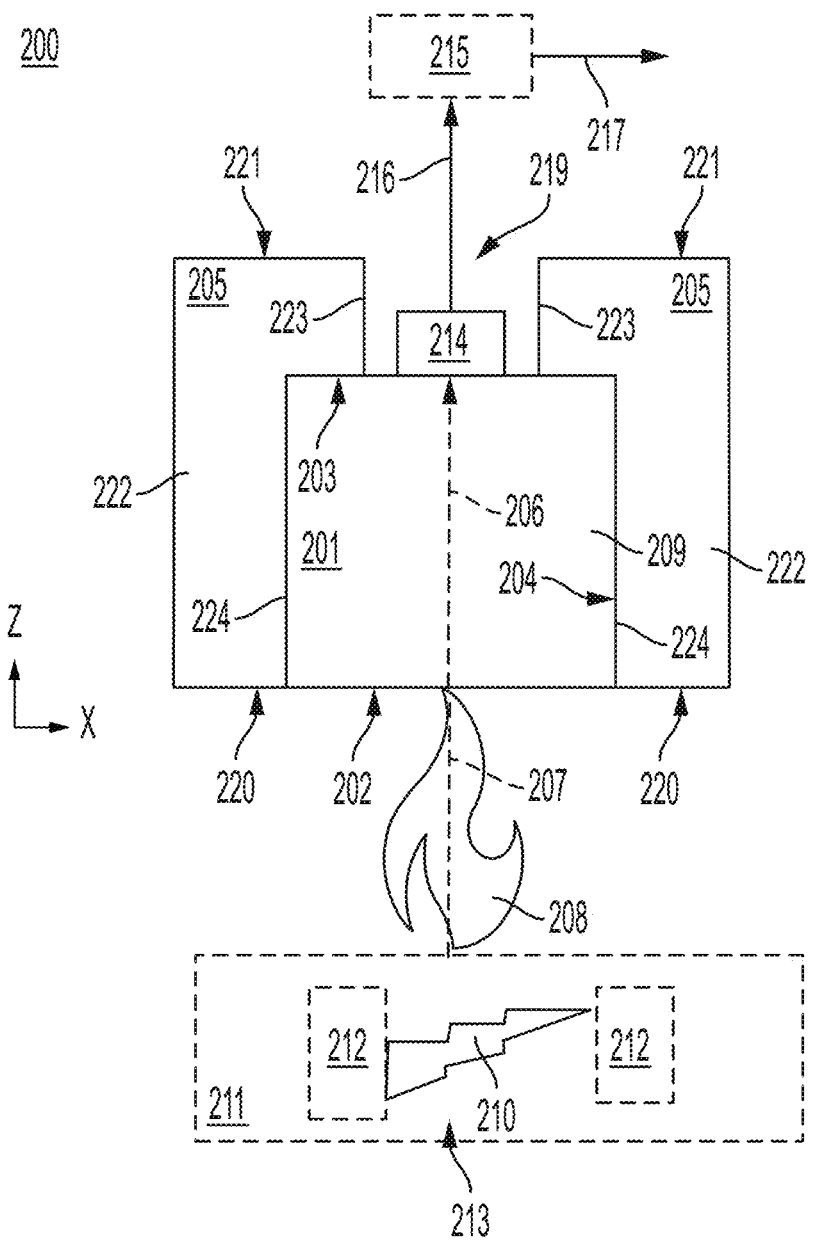
FIG. 1 shows a cross-section of a high energy arc-compatible thermal capacitance sensor, according to some embodiments.
Figure 2:
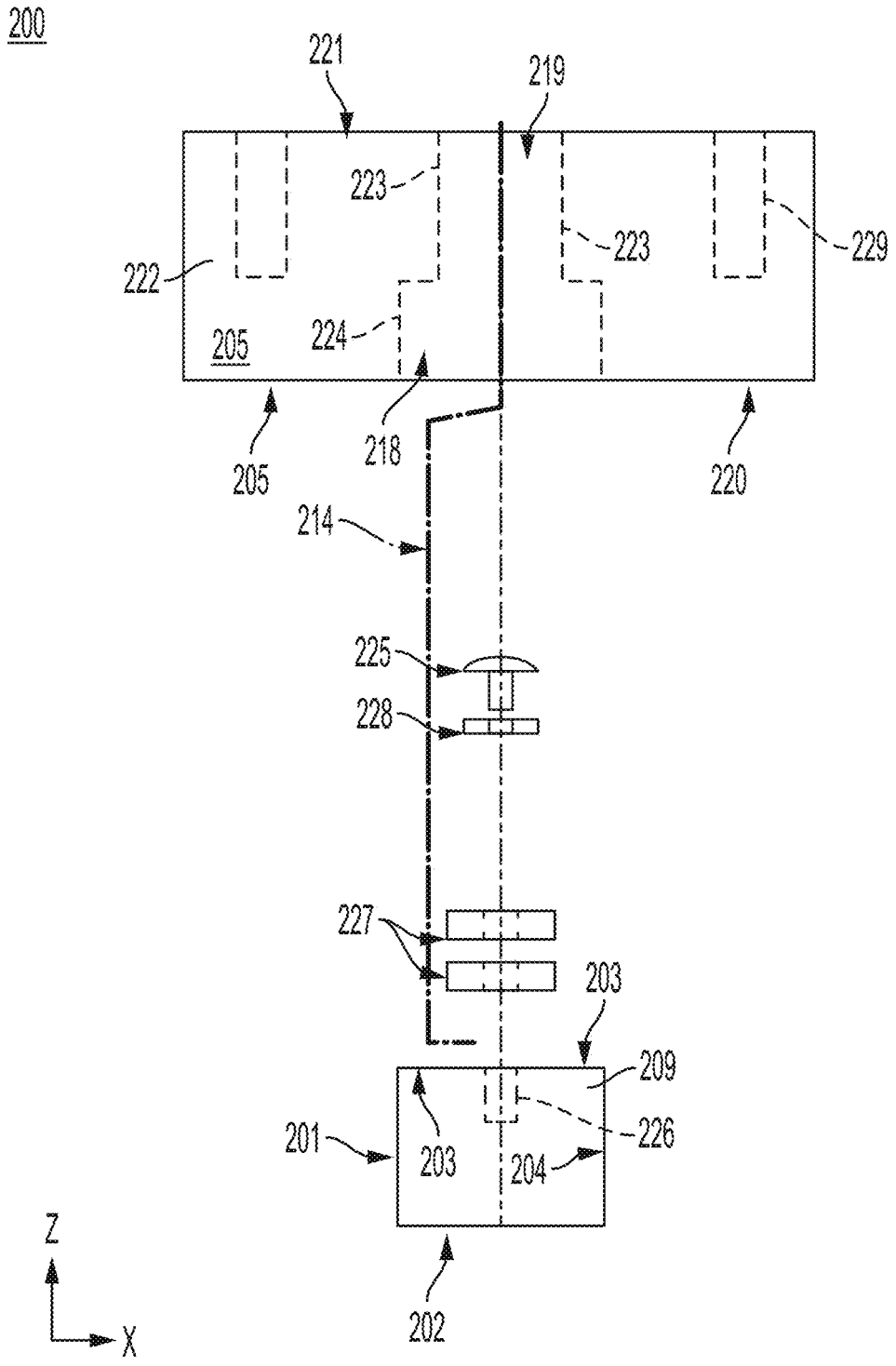
FIG. 2 shows an exploded view of a high energy arc-compatible thermal capacitance sensor, according to some embodiments.
Figure 3:
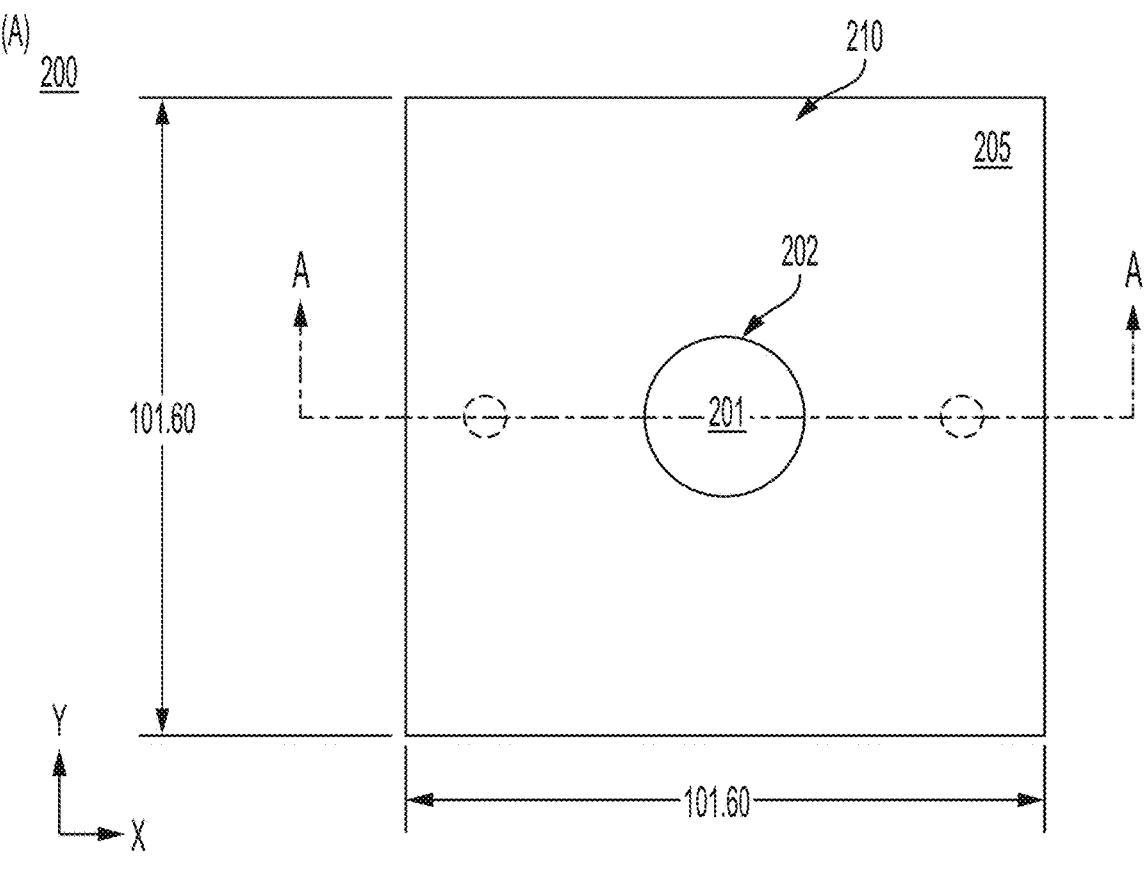
FIG. 3 shows: (A) a plan view of a high energy arc-compatible thermal capacitance sensor; and (B) a cross-section along line A-A of the high energy arc-compatible thermal capacitance sensor shown in panel A, according to some embodiments.
Figure 3:
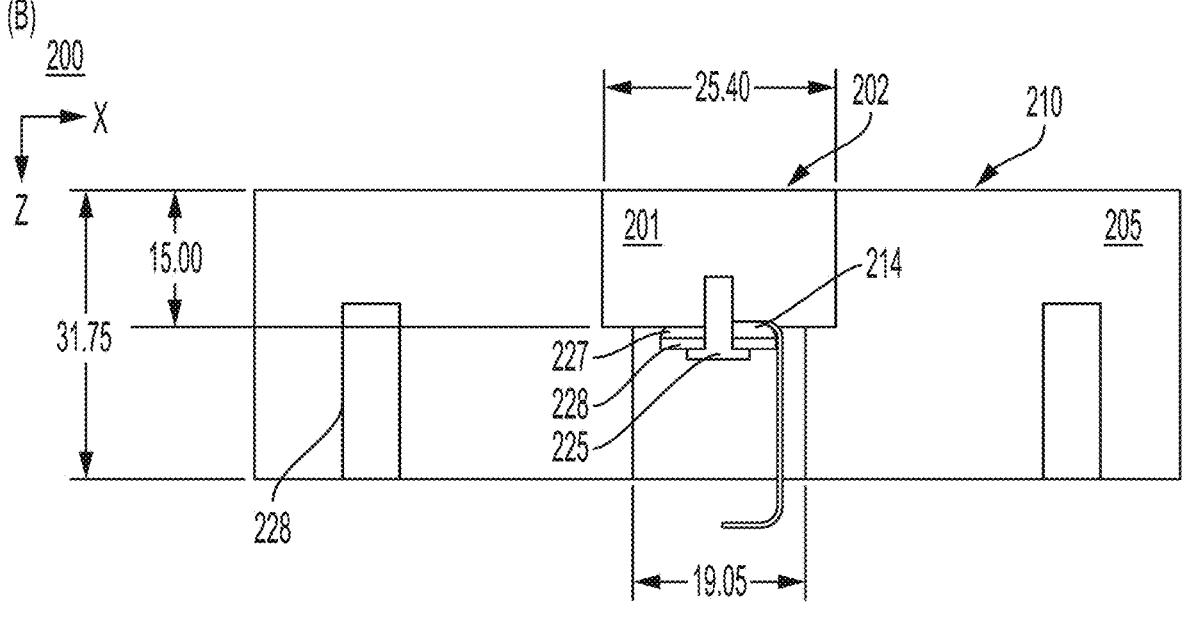
Figure 4:
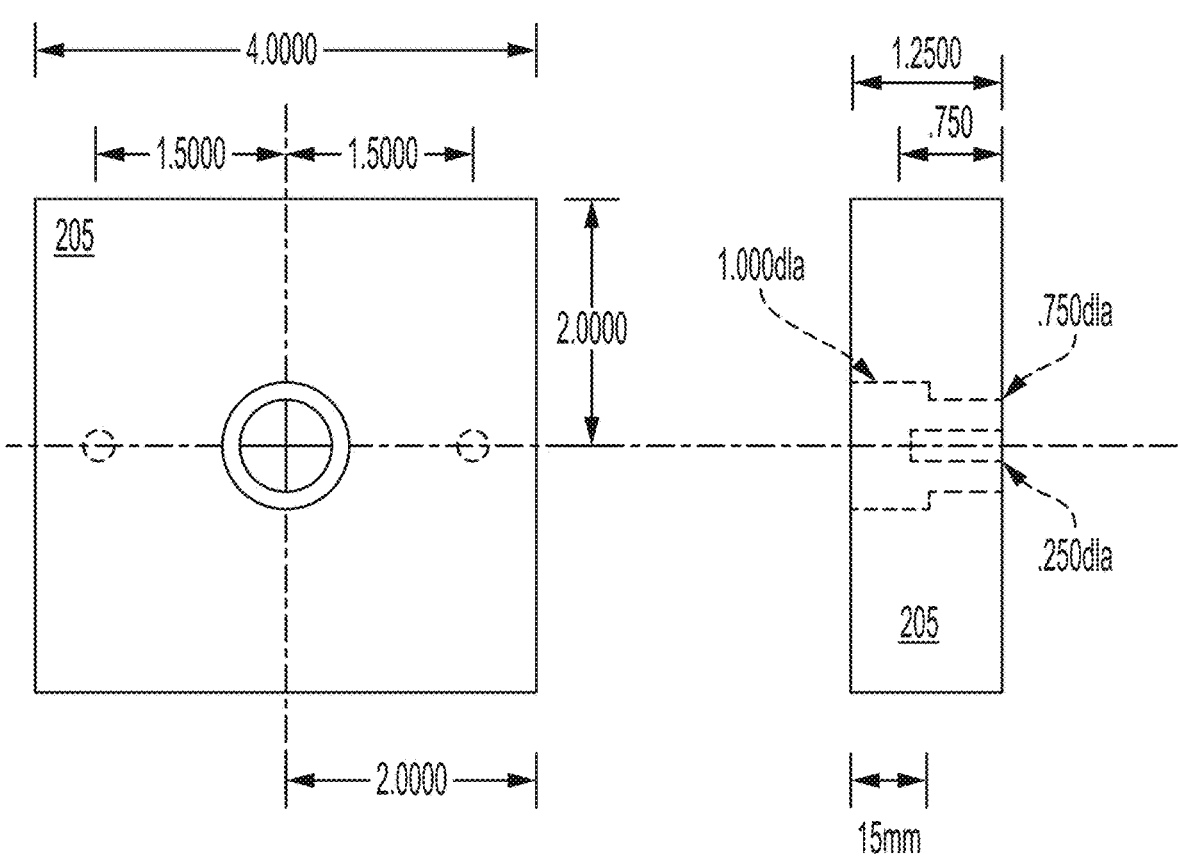
FIG. 4 shows a plan view and cross-section of a refractory insulation member, according to some embodiments.
Figure 5:
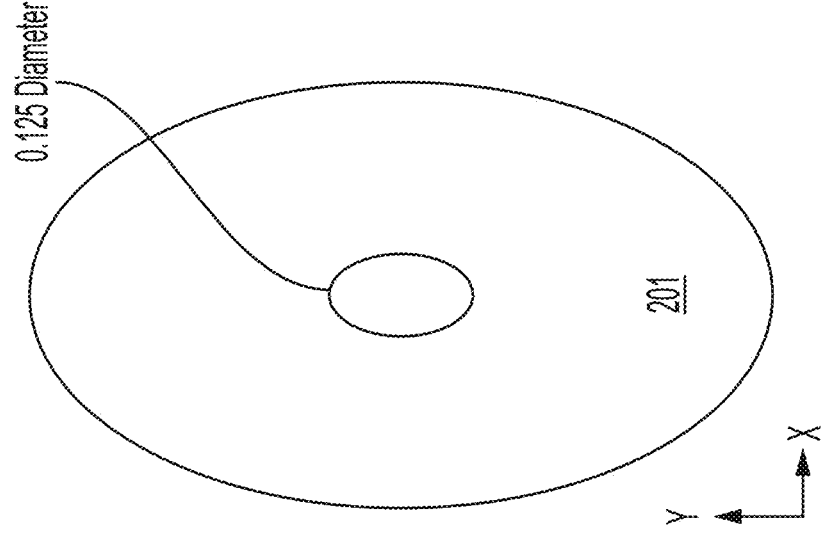
FIG. 5 shows a plan view and cross-section of a thermally capacitive slug, according to some embodiments.
Figure 5:
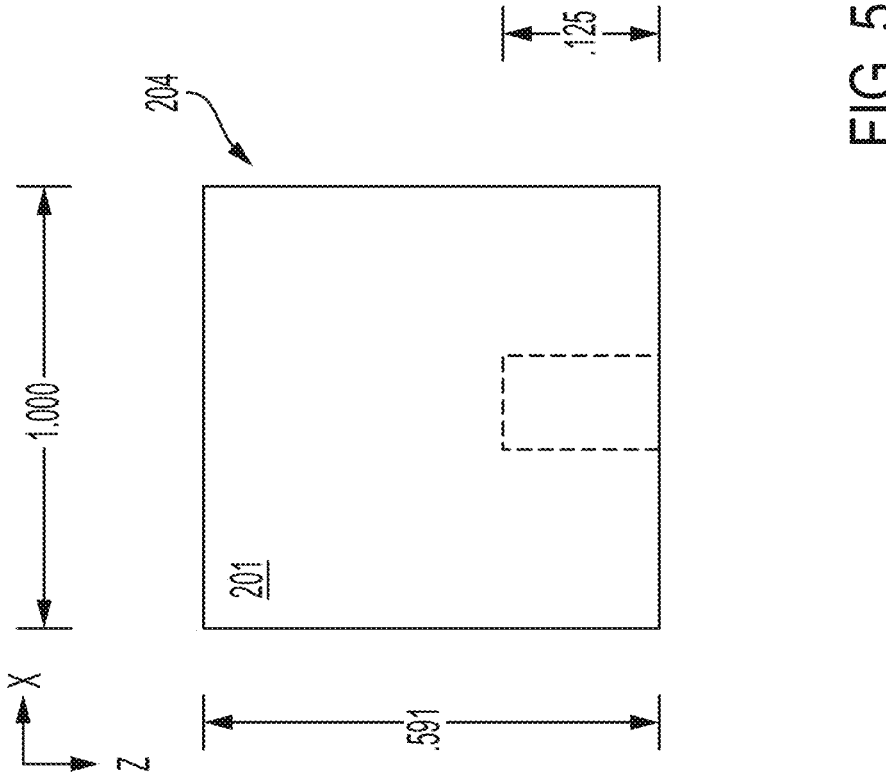
Figure 6:
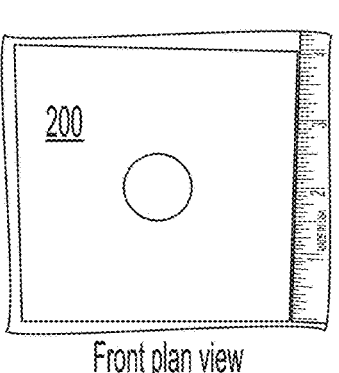
FIG. 6 shows photographs of several views of a high energy arc-compatible thermal capacitance sensor, fasteners, and thermally capacitive slug, according to some embodiments.
Figure 6:
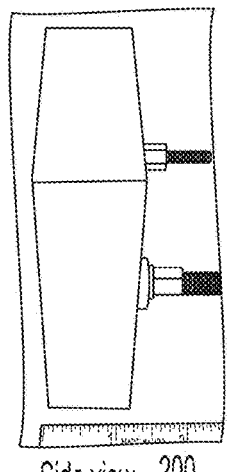
Figure 6:
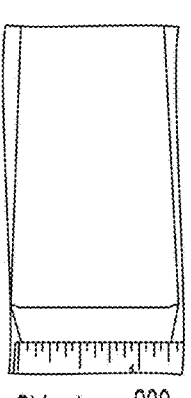
Figure 6:
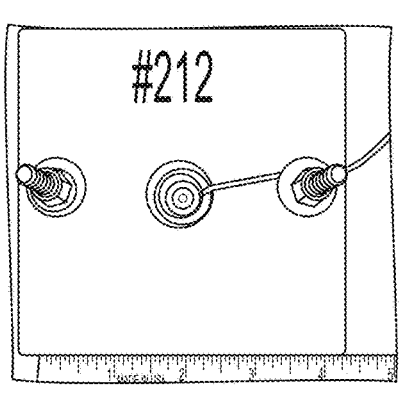
Figure 6:
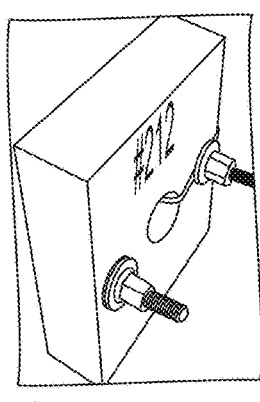
Figure 6:
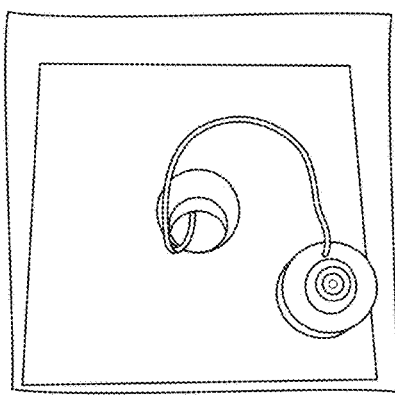
Figure 6:
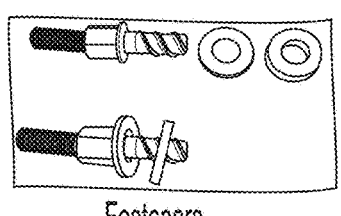
Figure 6:
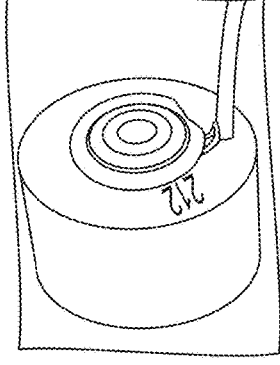
Figure 7:
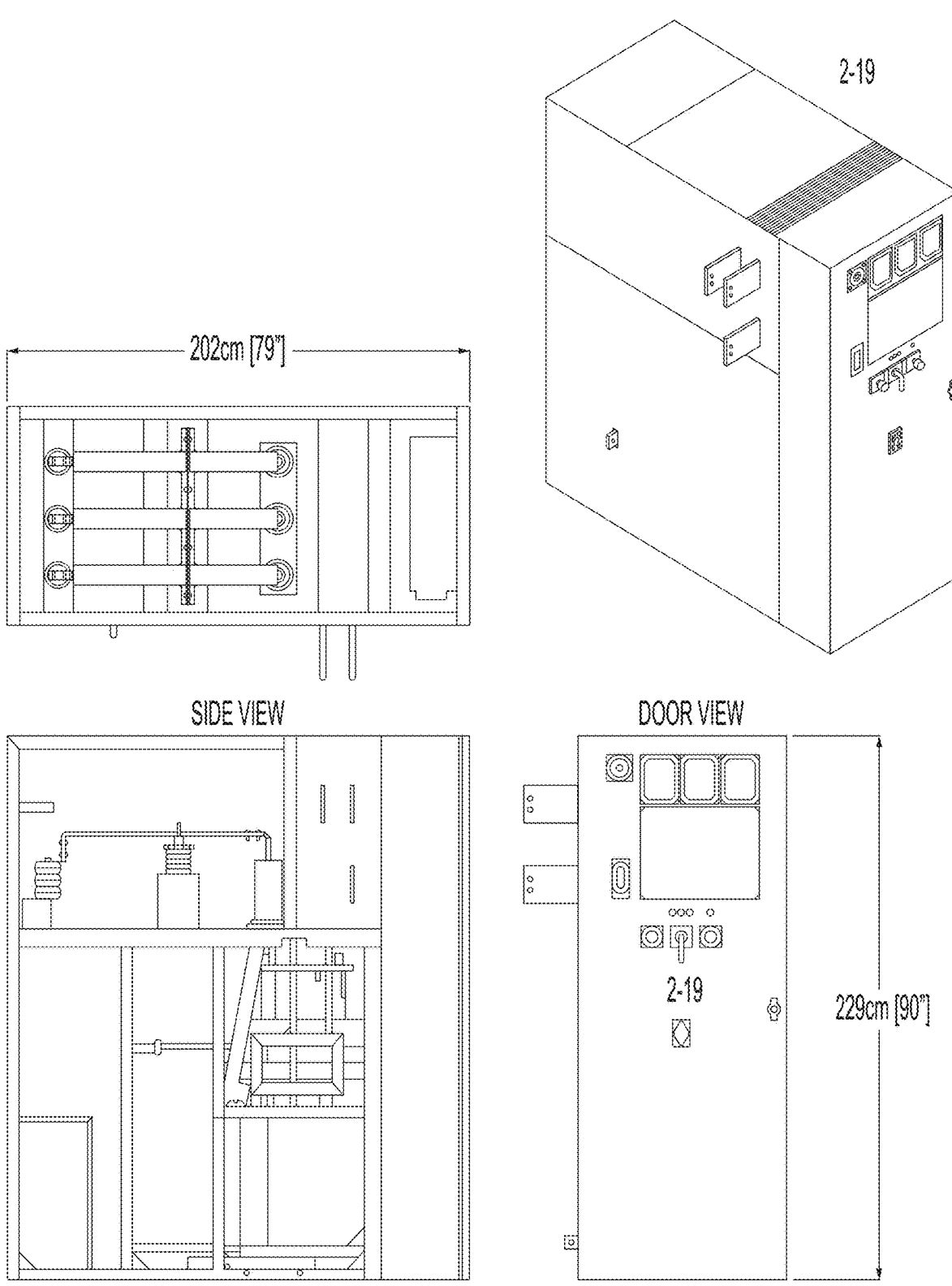
FIG. 7 shows a medium voltage electrical enclosure as a test device, according to some embodiments.

A detailed description of one or more embodiments is presented herein by way of exemplification and not limitation.

Various high energy arc events are contemplated and include a high energy arcing fault, arc flash, and the like. High energy arcing fault (HEAF) refers to a sustained discharge of electric current across a gap between two electrical conductors with different voltages. HEAF is an electrical failure that occurs in electrical switching equipment, e.g., with a voltage greater than or equal to 440 volt (V). Arc flash, a broad term used by the electrical and fire protection communities, refers to an electrical arc. The National Fire Protection Association (NFPA) and Institute of Electrical and Electronics Engineers (IEEE) have standards that deal with arc flashes and focus upon personnel protection.

When switching equipment is operating normally, electric current flows through the intended circuit path. An insulating medium, e.g., air, prevents the current from flowing to other conductors. However, the electric field across the insulating medium can be great enough so that the insulating medium breaks down and electrically conducts, and electrical current flows across the gap between conductors. As current flows across the gap, resistance of the insulating medium causes the arc to generate significant heat, light, and pressure that can damage the electrical equipment.

HEAFs and arc flashes are similar. Both HEAFs and arc flashes start with an electrical arc. However, a HEAF and an arc flash have a different duration for the temporal duration during which discharge occurs before being extinguished. Arc flashes are arcs that extinguish quickly, e.g., within a few electrical cycles, or fractions of a second. HEAFs are arcs that occur for longer times than arc flashes. HEAF can include arcing faults that last for two seconds or longer.

A HEAF can have various causes that include contamination or ingress of foreign material ingress that can occur when foreign material is disposed in an electrode gap that lowers electrical resistance of the gap, causing current to flow. Poor electrical connections occur when an electrical connection is not secure, such as a misaligned breaker or loose bolts, wherein an unexpected gap can occur in the circuit, causing an arc. Aged electrical connections can be a source of conditions for HEAF: As electrical connections age, they can begin to increase in electrical resistance, or the connection can deteriorate and produce an undesired gap that can cause an arc. Human error can occur, wherein an operator or technician can incorrectly install or accidentally energize equipment that can cause an arcing fault. Design errors can occur, wherein electrical distribution systems that rely on protective relays to isolate faults have parameters of the protective systems that are not properly set, resulting in arcing faults that persist for longer periods of time.

A HEAF can occur anywhere electrical distribution equipment with voltages greater than 440 V is in operation, such as electrical power plants, electrical switchyards, and industrial settings. Due to their energetic nature, HEAFs can quickly damage multiple systems, structures, or components before the installed protection systems can actuate. This can challenge a facility's safe shutdown operation.

The temperature of the area of current flow between electrodes (the arc column), depends on factors, including the resistance of the gap and the magnitude of the current. Electrical arcs can obtain high temperatures, such as 35,000° F. (19,427° C.). The temperature of an arc's surroundings depends on the properties of the arc, enclosure geometry, surface emissivity, exposure duration, and shielding. Arcs can melt or vaporize metals such as copper, aluminum, and steel.

HEAFs can damage adjacent equipment in a number of ways. A mode of damage is direct thermal damage. HEAFs generate extremely high temperatures and heat fluxes that can melt, vaporize, or ignite surrounding equipment and electrical cables. A HEAF can cause ignition of surrounding equipment that can burn after the arc has been extinguished. Pressure damage can occur, wherein the air around the arc rapidly heats and expands, resulting in a pressure front that can damage nearby equipment. A HEAF also generates plasma, ionized gas, and particulate matter, which can damage or affect the function of nearby equipment.

The system voltage (the normal operating voltage of the equipment) and the arc voltage (the difference in electric potential across the conductors while the arc is occurring) play a role in HEAF. The system voltage affects the ability of the electric current to strike and maintain an arc. The arc voltage can determine the energy release of the HEAF.

The power of an arc can be provided by a product of the arc voltage and the arc current. Severity of high-power arcs depend on the lifetime of the high-power arc. The total amount of energy released by a HEAF is the product of arc power and arc duration. The longer an arc is sustained, the more time that arc has to generate damaging conditions.

Due to the incident energy and heat flux of a HEAF conventional instruments that are used to measure properties of HEAF fail during the arc event. There is long-felt but unmet need for a sensor that can withstand the total amount of energy released by a HEAF.

It has been discovered that high energy arc-compatible thermal capacitance sensor 200 overcomes these deficiencies of conventional technology and measures the heat flux and incident energy of high energy arc event 210. Accordingly, high energy arc-compatible thermal capacitance sensor 200 characterizes the thermal conditions from arc flash and HEAF events in electrical equipment such as switchgear and bus ducts and withstands, without destruction or impairment of operation or operability, the extreme thermal environments from the arc flash, fire, and plasma jets that are emitted during a HEAF. Advantageously, high energy arc-compatible thermal capacitance sensor 200 has a rugged construction, is low cost, can be but need not be cooled by water or other fluids, has known emissivity and convective heat flux coefficients, has sufficient dynamic range, provides data with reasonable uncertainty, and can be operated with simple data acquisition equipment. Beneficially, high energy arc-compatible thermal capacitance sensor 200 measures the peak heat flux and incident energy from a HEAF and heat fluxes greater than 5 MW/m$^2$ for 8 s. Further, high energy arc-compatible thermal capacitance sensor 200 measures the extreme thermal exposure over the duration of high energy arc event 210 with a reasonable level of measurement uncertainty, and the heat and energy do not over-range high energy arc-compatible thermal capacitance sensor 200.

High energy arc-compatible thermal capacitance sensor 200 measures heat flux and incident energy of a high energy arc event. In an embodiment, with reference to FIG. 1, FIG. 2, FIG. 3, FIG. 4, FIG. 5, and FIG. 6, high energy arc-compatible thermal capacitance sensor 200 includes: thermally capacitive slug 201 including: refractory metal 209 that nondestructively withstands changes in shape, volume, and mass while being subjected to plasma jet 208 from high energy arc event 210 for a duration of exposure time of at least 8 seconds and at least 10,000° C. or 8 MV/m$^2$; exposed high energy arc receiver surface 202 that receives heat flux and incident energy 207 from plasma jet 208 and produces thermal energy 206 from receiving heat flux and incident energy 207; hidden thermal energy transfer surface 203 arranged relative to exposed high energy arc receiver surface 202 so that hidden thermal energy transfer surface 203 is not exposed to plasma jet 208 and heat flux and incident energy 207 and so that hidden thermal energy transfer surface 203 receives thermal energy 206 from exposed high energy arc receiver surface 202, wherein thermal energy 206 is communicated from exposed high energy arc receiver surface 202 to hidden thermal energy transfer surface 203 through refractory metal 209, wherein refractory insulation member 205 blocks plasma jet 208 and heat flux and incident energy 207 from hidden thermal energy transfer surface 203; and mounting surface 204 that mechanically engages refractory insulation member 205 such that mounting surface 204 is interposed between exposed high energy arc receiver surface 202 and hidden thermal energy transfer surface 203, and such that mounting surface 204 is not exposed to plasma jet 208 and heat flux and incident energy 207 by refractory insulation member 205 that blocks mounting surface 204 from plasma jet 208 and heat flux and incident energy 207; refractory insulation member 205 on which thermally capacitive slug 201 is disposed and including: slug receptacle 218 bounded by receptacle wall 224 and that receives thermally capacitive slug 201, such that receptacle wall 224 mechanically engages mounting surface 204 of thermally capacitive slug 201 and fixes a position of mounting surface 204 of thermally capacitive slug 201; and output interface aperture 219 bounded by aperture wall 223 and that provides communication between temperature reader 214 disposed on hidden thermal energy transfer surface 203 of thermally capacitive slug 201 and thermal energy analyzer 215, such that thermal energy data 216 is communicable from temperature reader 214 to thermal energy analyzer 215; and temperature reader 214 disposed on hidden thermal energy transfer surface 203 of thermally capacitive slug 201 and in thermal communication with hidden thermal energy transfer surface 203 and that measures a temperature of hidden thermal energy transfer surface 203, such that temperature reader 214; is not exposed to plasma jet 208 and heat flux and incident energy 207 by refractory insulation member 205 that blocks temperature reader 214 from plasma jet 208 and heat flux and incident energy 207; and receives thermal energy 206 from hidden thermal energy transfer surface 203; produces thermal energy data 216 from thermal energy 206, such that heat flux and incident energy 207 of high energy arc event 210 is determinable from thermal energy data 216.

In an embodiment, thermally capacitive slug 201 includes fastener receiver 226 arranged proximate to hidden thermal energy transfer surface 203 and that receives fastener 225 that fastens temperature reader 214 to thermally capacitive slug 201.

In an embodiment, high energy arc-compatible thermal capacitance sensor 200 includes fastener 225 disposed on thermally capacitive slug 201 that is received by fastener receiver 226 and that that fastens temperature reader 214 to thermally capacitive slug 201.

In an embodiment, high energy arc-compatible thermal capacitance sensor 200 includes electrically insulating spacer 227 interposed between fastener 225 and temperature reader 214.

In an embodiment, high energy arc-compatible thermal capacitance sensor 200 includes mechanical load distributor 228 interposed between fastener 225 and electrically insulating spacer 227.

In an embodiment, refractory insulation member 205 includes mounting member 229 to mount high energy arc-compatible thermal capacitance sensor 200 to a support structure, e.g., a bulkhead, scaffold, and the like.

In an embodiment, with reference to FIG. 1, FIG. 2, FIG. 3, FIG. 4, FIG. 5, and FIG. 6, high energy arc-compatible thermal capacitance sensor 200 includes: thermally capacitive slug 201 including: refractory metal 209 that nondestructively withstands changes in shape, volume, and mass while being subjected to plasma jet 208 from high energy arc event 210 for a duration of exposure time of at least 8 seconds and at least 10000° C.; exposed high energy arc receiver surface 202 that receives heat flux and incident energy 207 from plasma jet 208 and produces thermal energy 206 from receiving heat flux and incident energy 207; hidden thermal energy transfer surface 203 arranged relative to exposed high energy arc receiver surface 202 so that hidden thermal energy transfer surface 203 is not exposed to plasma jet 208 and heat flux and incident energy 207 and so that hidden thermal energy transfer surface 203 receives thermal energy 206 from exposed high energy arc receiver surface 202, wherein thermal energy 206 is communicated from the exposed high energy arc receiver surface 202 to hidden thermal energy transfer surface 203 through refractory metal 209, wherein refractory insulation member 205 blocks plasma jet 208 and heat flux and incident energy 207 from hidden thermal energy transfer surface 203; mounting surface 204 that mechanically engages refractory insulation member 205 such that mounting surface 204 is interposed between exposed high energy arc receiver surface 202 and hidden thermal energy transfer surface 203, and such that mounting surface 204 is not exposed to plasma jet 208 and heat flux and incident energy 207 by refractory insulation member 205 that blocks mounting surface 204 from plasma jet 208 and heat flux and incident energy 207; and fastener receiver 226 arranged proximate to hidden thermal energy transfer surface 203 and that receives fastener 225 that fastens temperature reader 214 to thermally capacitive slug 201; refractory insulation member 205 on which thermally capacitive slug 201 is disposed and including: ceramic that electrically insulates hidden thermal energy transfer surface 203, thermally capacitive slug 201, and temperature reader 214 from heat flux and incident energy 207 of high energy arc event 210; slug receptacle 218 bounded by receptacle wall 224 and that receives thermally capacitive slug 201, such that receptacle wall 224 mechanically engages mounting surface 204 of thermally capacitive slug 201 and fixes a position of mounting surface 204 of thermally capacitive slug 201; output interface aperture 219 bounded by aperture wall 223 and that provides communication between temperature reader 214 disposed on hidden thermal energy transfer surface 203 of thermally capacitive slug 201 and thermal energy analyzer 215, such that thermal energy data 216 is communicable from temperature reader 214 to thermal energy analyzer 215; and mounting member 229 to mount high energy arc-compatible thermal capacitance sensor 200 to a support structure; temperature reader 214 disposed on hidden thermal energy transfer surface 203 of thermally capacitive slug 201 and in thermal communication with hidden thermal energy transfer surface 203 and that measures a temperature of hidden thermal energy transfer surface 203, such that temperature reader 214: includes a thermocouple, a resistance temperature detector, a thermometer, a thermistor, or a combination comprising at least one of the foregoing temperature readers; is not exposed to plasma jet 208 and heat flux and incident energy 207 by refractory insulation member 205 that blocks temperature reader 214 from plasma jet 208 and heat flux and incident energy 207; and receives thermal energy 206 from hidden thermal energy transfer surface 203; produces thermal energy data 216 from thermal energy 206, such that heat flux and incident energy 207 of high energy arc event 210 is determinable from thermal energy data 216; fastener 225 disposed on thermally capacitive slug 201 that is received by fastener receiver 226 and that that fastens temperature reader 214 to thermally capacitive slug 201; electrically insulating spacer 227 interposed between fastener 225 and temperature reader 214 and that comprises a ceramic paper washer that electrically insulates fastener 225 and temperature reader 214; and mechanical load distributor 228 interposed between fastener 225 and electrically insulating spacer 227.

High energy arc-compatible thermal capacitance sensor 200 can be made of various elements and components that can be fabricated or obtained from a supplier. Elements of high energy arc-compatible thermal capacitance sensor 200 can be various sizes and made of a material that is physically or chemically resilient in an environment in which high energy arc-compatible thermal capacitance sensor 200 is disposed. Exemplary materials include a metal, ceramic, and the like. Certain elements of high energy arc-compatible thermal capacitance sensor 200 can be made of the same or different material and can be monolithic in a single physical body or can be separate members that are physically joined.

Thermally capacitive slug 201 includes refractory metal 209. The refractory metal can be selected from many different chemical elements, e.g., tungsten, molybdenum, and the like. It should be appreciated that the refractory metal is robust to withstand the duration of high energy arc event 210, including a HEAF, In this respect, thermally capacitive slug 201, due to refractory metal 209, nondestructively withstands changes in shape, volume, and mass while being subjected to plasma jet 208 from high energy arc event 210 for a duration of exposure time of at least 8 seconds and at least 10,000° C. Thermally capacitive slug 201 can have a shape that provides for operability of high energy arc-compatible thermal capacitance sensor 200 such as a cylindrical shape. Thermally capacitive slug 201 can be a cylindrical tungsten slug with a bored hole and the surface of the unbored flat of the cylinder coated with high temperature, high emissivity, paint.

In an embodiment, thermally capacitive slug 201 is a tungsten cylinder, 99.95% pure, 1.000 in (25.4 mm) in diameter, 15 mm long. Thermally capacitive slug 201 can have a square bottomed hole from hidden thermal energy transfer surface 203 that is bored on centerline of one end of the cylinder, 0.125 in (3.18 mm) deep, 0.125 in (3.18 mm) diameter. Here, exposed high energy arc receiver surface 202, opposing hidden thermal energy transfer surface 203, is coated with flat black heat resistant paint with an emissivity of approximately 95%.

In high energy arc-compatible thermal capacitance sensor 200, fastener 225 can include a rivet that mechanically engages fastener receiver 226. The rivet can be, e.g., stainless steel that is disposed in fastener receiver 226 bored into thermally capacitive slug 201 to provide a force that fastens temperature reader 214 (e.g., a thermocouple bead) in contact with hidden thermal energy transfer surface 203 of thermally capacitive slug 201. In an embodiment, the rivet includes grade 340 stainless steel, a tubular rivet with partially hollow shank for easier upset, a ⅛ in (3.18 mm) diameter shank, 7/32 in (5.56 mm) shank length, 9/32 in (7.14 mm) head diameter, and like dimensions.

Electrically insulating spacer 227 provides electrical insulation between components of thermally capacitive slug 201, e.g., fastener 225 and temperature reader 214. An exemplary electrically insulating spacer 227 is a ceramic paper washer that electrically insulates the fastener 225 and the temperature reader 214. In an embodiment, two ceramic paper washers are disposed on the rivet to electrically insulate the thermocouple wire from the stainless steel rivet and stainless steel washer. In an embodiment, ceramic paper washers (×2) can be ⅛ in (3.18 mm) thick alumina-silica rated to 1260 degrees C. with an inside diameter of 0.125 in (3.18 mm) and an external diameter of 0.500 in (12.7 mm). The ceramic washers can be used in combination with A grade 18-8 stainless steel washer 0.036 in (0.914 mm) to 0.065 in (1.651 mm) thick with an internal diameter of 0.140 in (3.56 mm) and an external diameter of 0.437 in (11.10 mm).

In an embodiment, mechanical load distributor 228 distributes the force imparted by thermally capacitive slug 201 and fastener 225 when combined to fasten temperature reader 214 to thermally capacitive slug 201. Here, mechanical load distributor 228 can include a metallic washer that is under mechanical compression by fastener 225 and thermally capacitive slug 201. An exemplary mechanical load distributor 228 is a stainless steel washer disposed on the rivet.

Temperature reader 214 provides a measurement of temperature of thermally capacitive slug 201. The output of temperature reader 214 can be analog or digital and can include an electronic signal, an optical signal, a mechanical signal, and the like. Exemplary temperature readers 214 include a thermocouple, a resistance temperature detector, a thermometer, a thermistor, or a combination comprising at least one of the foregoing temperature readers. In an embodiment, temperature reader 214 includes a two conductor, insulated, thermocouple wire with welded thermocouple bead disposed in thermal communication with hidden thermal energy transfer surface 203 of thermally capacitive slug 201, wherein the thermocouple bead is located proximate to fastener receiver 226.

The thermocouple wire can be Type-K covered with a woven glass high temperature insulation, 24 AWG nominal diameter (0.51 mm (0.02 in)). The two electrical conductors of the thermocouple wire are welded to form a bead approximately 1.0 mm in diameter (0.04 in). Depending on the thermal conditions to be measured and the length of thermally capacitive slug 201, other thermocouple types can be used, e.g., Type-J.

In an embodiment, refractory insulation member 205 includes a ceramic that insulates hidden thermal energy transfer surface 203, thermally capacitive slug 201, and temperature reader 214 from heat flux and incident energy 207 of high energy arc event 210. The ceramic of refractory insulation member 205 can be a ceramic that is resilient to the conditions of plasma jet 208 and high energy arc event 210. An exemplary ceramic is calcium silicate. In an embodiment, refractory insulation member 205 includes a thru-bored and counter-bored block of calcium silicate that provide output interface aperture 219 bounded by aperture wall 223 and receptacle wall 224 that engages mounting surface 204 of thermally capacitive slug 201. Here, thermally capacitive slug 201 can be press fit into the calcium silicate block, wherein the thermocouple wire of temperature reader 214 is disposed in output interface aperture 219.

In an embodiment, refractory insulation member 205 includes a calcium silicate block that can be 4.0 in (102 mm) by 4.0 in (102 mm) by 1.25 in (31.8 mm) in size. Here, receptacle wall 224 and output interface aperture 219 are a through hole of 0.750 in (19.1 mm) in the center of the face of the block, which is counter bored with a 1.000 in (25.4 mm) diameter hole to a depth of 15 mm. Further, refractory insulation member 205 is large enough to support thermally capacitive slug 201 and provide space for other holes, e.g., fastener receiver 226, for mounting high energy arc-compatible thermal capacitance sensor 200 to an instrument rack.

It is contemplated that the calcium silicate board of refractory insulation member 205 has a nominal density of 737 kg/m^3, compressive strength of 70 kg/cm^2 for 5% deformation, tensile strength of 3.9 kg/cm^2 normal to the face of the sheet, thermal conductivity of 0.12 W/(m K) at 205 degrees C., and a specific heat of 1.256 KJ/(kg K) [0.30 BTU/(degree F lb)] at 205 degrees C. The thermal properties of the calcium silicate board are arbitrary, and a heat transfer analysis can determine the uncertainty associated with differences in the calcium silicate block. The calcium silicate block can have a Universal Laboratories (UL) flame spread rating of 0. It should be appreciated that combustion of components of the calcium silicate block can adversely affect measurement of heat flux and incident energy.

In an embodiment, high energy arc-compatible thermal capacitance sensor 200 measures heat flux and incident energy 207 during high energy arc event 210 such as HEAF or other environments with very high thermal exposures. In an embodiment, high energy arc-compatible thermal capacitance sensor 200 includes a tungsten cylinder approximately 1.00 in (25.4 mm) in diameter by 15 mm (0.59 in) long mounted in a 1.25 in (32 mm) thick calcium silicate block. The front face of the tungsten cylinder is painted with high temperature flat black paint with a known emissivity of approximately 0.95. A Type-K thermocouple is attached to the rear of the tungsten cylinder to measure the temperature during heating. Tungsten has a higher melting point (approximately 3422° C. [6192° F.]) than copper (approximately 1085° C. [1985° F.]) or certain alloys (e.g., Inconel (approximately 1400° C. [2552° F.])), while having similar thermal inertia and an order of magnitude higher thermal conductivity than Inconel. These properties increase the survivability of thermally capacitive slug 201 in the harsh HEAF thermal environment and provide good thermal performance. The length of the tungsten cylinder can be determined by heat transfer calculations that assure that for a given heat exposure the thermocouple at the rear of the cylinder does not exceed the maximum calibrated range for the thermocouple, which is approximately 1260 degrees C. for the Type-K thermocouple.

The 15 mm tungsten cylinder length is an output from heat transfer calculations and modeling for a heat exposure of 5 MW/m^2 for 8 s. The cylinder length can be shorter for lower thermal exposures and longer for higher thermal exposures. Due to the physical properties of tungsten, the thermocouple is not welded or peened to the rear of the cylinder. Adhesives can be ineffective due to the temperature ranges and physical stresses encountered.

In an embodiment, high energy arc-compatible thermal capacitance sensor 200 includes a rivet, non-electrically conductive and thermally insulative ceramic paper washers, and a stainless steel washer to physically hold the thermocouple bead in thermal contact with the rear face of the tungsten cylinder. The rivet is plastically deformed in the hole bored in the rear of the tungsten cylinder, with the stainless steel washer and head of the rivet providing clamping forces. The high temperature ceramic paper washers thermally and electrically insulate the thermocouple from the stainless steel washer and rivet. The ceramic paper washers and calcium silicate block provide thermal insulation that reduces measurement uncertainty, while the electrical insulation afforded by the ceramic paper washers prevents an additional thermocouple junction from forming at the stainless steel washer or rivet. The calcium silicate block provides physical support and electrical isolation for the tungsten cylinder so that the device can be attached to an instrument stand that supports high energy arc-compatible thermal capacitance sensor 200 and fixes high energy arc-compatible thermal capacitance sensor 200 in place during for exposure to high energy arc event 210, where high temperatures, high momentum plasma jets, and projectiles can be present. The construction of high energy arc-compatible thermal capacitance sensor 200 can be rigid and resistant to damage from these threats.

The calcium silicate board can be a refractory material with high heat resistance and low thermal conductivity. This reduces the heat losses from the tungsten through the side and back surfaces, while assuring that the heat exposure to the tungsten is only via the front painted surface, which decreases the measurement uncertainty. The electrical insulation properties of the calcium silicate block also electrically isolate the tungsten cylinder and thermocouple from the support structure or instrument stand to which high energy arc-compatible thermal capacitance sensor 200 is mounted.

High energy arc-compatible thermal capacitance sensor 200 can be made in various ways. It should be appreciated that high energy arc-compatible thermal capacitance sensor 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, high energy arc-compatible thermal capacitance sensor 200 can be disposed in a terrestrial environment or space environment. Elements of high energy arc-compatible thermal capacitance sensor 200 can be formed from suitable materials such as ceramic, metal, and the like. According to an embodiment, the elements of high energy arc-compatible thermal capacitance sensor 200 are formed by machining a stock material such as block of material that is subjected to removal of material such as by cutting, laser oblation, and the like. Accordingly, high energy arc-compatible thermal capacitance sensor 200 can be made by additive or subtractive manufacturing. In an embodiment, elements of high energy arc-compatible thermal capacitance sensor 200 are selectively removed and subjected to joining to form high energy arc-compatible thermal capacitance sensor 200.

In an embodiment, high energy arc-compatible thermal capacitance sensor 200 is made by cutting a calcium silicate board into squares using a dry process, machining the through hole using an end mill, counterboring the hole using a counterbore tool, wherein cutting and machining is performed dry. The process also includes cutting a tungsten rod into lengths by mechanical cutting or electrical discharge machining. Tungsten rod can have a smooth surface finish. The ends of the tungsten rod are parallel to each other and perpendicular to the longitudinal axis of the tungsten cylinder. Forming the hole in the tungsten cylinder by machining with an end mill. Preparing temperature reader 214 by stripping about ½ in (13 mm) of insulation jacket from a thermocouple cable of suitable length for the experimental application; stripping about ¼ in (6 mm) of insulation from each conductor; and welding the tips of the two conductors together using a thermocouple welder to form the thermocouple bead.

The process for making high energy arc-compatible thermal capacitance sensor 200 also can include disposing the stainless steel and the two ceramic paper washers on the rivet; disposing the thermocouple bead against the surface of the tungsten cylinder adjacent to the hole, with the thermocouple wire aligned so that it forms a radius to the circular end of the cylinder; disposing the rivet in the hole, with the thermocouple bead against the tungsten cylinder, and the two ceramic paper washers against the other side of the thermocouple bead, wherein the thermocouple bead does not contact the shaft of the rivet; driving, by an arbor press or the like, the rivet into the hole in the tungsten cylinder, expanding the rivet; and forming a strong mechanical connection between the thermocouple and the tungsten cylinder.

The process for making high energy arc-compatible thermal capacitance sensor 200 also can include extending the thermocouple cable through the calcium silicate block from the counterbored side through the opposite end of the block; pressing the tungsten cylinder into the calcium silicate block using an arbor press or similar press; cleaning the exposed surface 202 of the tungsten cylinder with alcohol or acetone; masking the calcium silicate block, e.g., with cardboard with a 1.0 in (25.4 mm) diameter hole; and spray painting the exposed surface of the tungsten cylinder with flat black, high temperature paint, with a high, know, emissivity of approximately 95%.

High energy arc-compatible thermal capacitance sensor 200 has numerous advantageous and unexpected benefits and uses. In an embodiment, a process for measuring heat flux and incident energy of a high energy arc event with high energy arc-compatible thermal capacitance sensor 200 includes: receiving, by exposed high energy arc receiver surface 202 of high energy arc-compatible thermal capacitance sensor 200, heat flux and incident energy 207 from plasma jet 208 of high energy arc event 210, high energy arc-compatible thermal capacitance sensor 200 comprising: a thermally capacitive slug 201 comprising: a refractory metal 209 that nondestructively withstands changes in shape, volume, and mass while being subjected to plasma jet 208 from high energy arc event 210 for a duration of exposure time of at least 8 seconds and at least 10,000° C.; the exposed high energy arc receiver surface 202 that receives heat flux and incident energy 207 from plasma jet 208; a hidden thermal energy transfer surface 203 arranged relative to exposed high energy arc receiver surface 202 so that hidden thermal energy transfer surface 203 is not exposed to plasma jet 208 and heat flux and incident energy 207; and a mounting surface 204 that mechanically engages refractory insulation member 205 such that mounting surface 204 is interposed between exposed high energy arc receiver surface 202 and hidden thermal energy transfer surface 203, and such that mounting surface 204 is not exposed to plasma jet 208 and heat flux and incident energy 207 by refractory insulation member 205 that blocks mounting surface 204 from plasma jet 208 and heat flux and incident energy 207; the refractory insulation member 205 on which thermally capacitive slug 201 is disposed and comprising: a slug receptacle 218 bounded by receptacle wall 224 and that receives thermally capacitive slug 201, such that receptacle wall 224 mechanically engages mounting surface 204 of thermally capacitive slug 201 and fixes a position of mounting surface 204 of thermally capacitive slug 201; and an output interface aperture 219 bounded by aperture wall 223 and that provides communication between temperature reader 214 disposed on hidden thermal energy transfer surface 203 of thermally capacitive slug 201 and thermal energy analyzer 215, such that thermal energy data 216 is communicable from temperature reader 214 to thermal energy analyzer 215; and the temperature reader 214 disposed on hidden thermal energy transfer surface 203 of thermally capacitive slug 201 and in thermal communication with hidden thermal energy transfer surface 203 and that measures a temperature of hidden thermal energy transfer surface 203, such that temperature reader 214: is not exposed to plasma jet 208 and heat flux and incident energy 207 by refractory insulation member 205 that blocks temperature reader 214 from plasma jet 208 and heat flux and incident energy 207; and receives thermal energy 206 from hidden thermal energy transfer surface 203; produces thermal energy data 216 from thermal energy 206, such that heat flux and incident energy 207 of high energy arc event 210 is determinable from thermal energy data 216; producing, by exposed high energy arc receiver surface 202, thermal energy 206 from heat flux and incident energy 207 in response to receiving heat flux and incident energy 207 from plasma jet 208; blocking, by refractory insulation member 205, plasma jet 208 and heat flux and incident energy 207 from hidden thermal energy transfer surface 203 and mounting surface 204 of thermally capacitive slug 201; communicating thermal energy 206 from exposed high energy arc receiver surface 202 to hidden thermal energy transfer surface 203 through refractory metal 209 receiving, by hidden thermal energy transfer surface 203, thermal energy 206 from exposed high energy arc receiver surface 202; communicating thermal energy 206 from hidden thermal energy transfer surface 203 to temperature reader 214; receiving, by temperature reader 214, thermal energy 206 from hidden thermal energy transfer surface 203; producing, by temperature reader 214, thermal energy data 216 from thermal energy 206; and determining heat flux and incident energy 207 of high energy arc event 210 from thermal energy data 216.

In an embodiment of measuring heat flux and incident energy of a high energy arc event, determining heat flux and incident energy 207 includes: obtaining the heat flux at exposed high energy arc receiver surface 202 from $$\dot{q}'' = \rho \cdot \overline{C_P} \cdot l \cdot \left( \frac{\Delta T}{\Delta t} \right)$$

wherein q̇" is the heat flux received by exposed high energy arc receiver surface 202; ρ is the density of thermally capacitive slug 201; $\overline{C_p}$ is the average heat capacity of thermally capacitive slug 201; l is the thickness of thermally capacitive slug 201; ΔT is the change in temperature of thermally capacitive slug 201, and Δt is the change in time over which ΔT is measured by temperature reader 214. The maximum heat flux at exposed high energy arc receiver surface 202 of thermally capacitive slug 201 is determined from this equation, wherein dimensions for the variables include: heat flux ($kW/m^2$), density ($kg/m^3$), average heat capacity (kJ/[kg·K]) , thickness (m), temperature ($^\circ$ C.), and time (s).

The energy flux (total incident energy) involves the heat transfer between the maximum temperature and the arc start temperature as follows $$Q''_{over\_test} = \rho l \frac{C_p(T_{max}) + C_p(T_{arc\_start})}{2}(T_{max} - T_{arc\_start})$$

with units of $KJ/m^2$. This is the total thermal energy received by exposed high energy arc receiver surface 202 during exposure to high energy arc event 210. Tarc_start is the temperature of thermally capacitive slug 201 before high energy arc event 210, and Tmax is the maximum temperature of thermally capacitive slug 201 after termination of high energy arc event 210.

The thermocouple wire can attached to a data acquisition system capable of measuring the millivolt signals from a thermocouple junction, referencing with a simulated ice junction, and converting the signal to temperature. The conversion can also be done in post processing of the data. The temperature is recorded before, during, and after high energy arc event 210, wherein high energy arc-compatible thermal capacitance sensor 200 is exposed to radiative or convective heating. The change in temperature from high energy arc event 210 and the rate of change of the temperature is combined with knowledge of the thermal properties of high energy arc-compatible thermal capacitance sensor 200 to calculate heat flux and incident energy.

High energy arc-compatible thermal capacitance sensor 200 and processes disclosed herein have numerous beneficial uses. High energy arc-compatible thermal capacitance sensor 200 measurement capabilities in severe environments, such as those posed by HEAF and aluminum combustion previously seen in full scale HEAF experiments. High energy arc-compatible thermal capacitance sensor 200 survives multiple exposures, including direct impingement of HEAF jets of fire and plasma. Even after multiple exposures, exposed high energy arc receiver surface 202 is not ablated or damaged. If the calcium silicate block or thermocouple wire are damaged, the device can be economically rebuilt by drilling out the rivet from the tungsten cylinder, and re-assembling with new washers, rivet, thermocouple, and calcium silicate block.

The articles and processes herein are illustrated further by the following Example, which is non-limiting.

EXAMPLE

This Example describes an experimental program that investigated High Energy Arcing Fault phenomena for medium voltage electrical switchgear containing aluminum conductors. This Example covers full-scale laboratory experiments using representative power plant three-phase electrical equipment. Electrical, thermal, and pressure data were recorded for each experiment and documented in this Example.

The HEAF experiments were performed on four near-identical units of metal-clad medium voltage switchgear, The three-phase arcing fault was initiated on the primary cable connection bus. All four experiments used the same system voltage (6.9 kV) but varied the current and duration. Real-time electrical operating conditions, including voltage, current and frequency, were measured during the experiments. Heat fluxes and incident energies were measured with plate thermometers and slug calorimeters at various locations around the electrical enclosures. Internal enclosure pressures were measured during the experiments. The experiments were documented with normal and high-speed videography, infrared imaging, and photography.

Insights from the experimental series included timing information related to enclosure breach, event progression, mass loss measurements for electrodes and steel enclosures, peak pressure rise, particle analysis, along with visual and thermal imaging data to better understand and characterize the hazard. These results will be used in subsequent efforts to advance the state of knowledge related to HEAF.

Infrequent events such as fires at a nuclear power plant can pose a significant risk to safe plant operations. Risk is handles by having robust fire protection programs designed to minimize the likelihood and consequences of fire. These programs provide reasonable assurance of adequate protection from known fire hazards, However, several hazards remain subject to a large degree of uncertainty, requiring significant safety margins in plant analyses.

One such hazard comprises an electrical arcing fault involving electrical distribution equipment and components comprised of aluminum. While the electrical faults and subsequent fires are considered in existing fire protection programs, the presence of aluminum during the electrical fault can exacerbate the damage potential of the event. The extended damage capacity could exceed the protection provided by existing fire protection features for specific fire scenarios and increase plant risk estimated in fire probabilistic risk assessments (PRAs).

Studies of fire and explosion hazards to the safe operation of electrical equipment includes developing data, tools, and methodologies to support risk and safety assessments. HEAF events are accompanied by loss of essential power and complicated shutdowns. In certain HEAF events, combustible loading within the enclosure was minimal. The primary enclosure contained polyolefin heat shrink tubing on the bus bars. However, the location where this material was located was separated from the primary cable compartment buses by metal cladding. The material was not on the primary cable compartment buses as discussed previously, The secondary enclosure contained protective relays, fuse holders, control switches, meters, resistors, and associated insulated conductors. The insulation on the SIS-insulated conductors represented most of the combustible loading in the secondary enclosure. Some of the wiring had been cut and removed prior to receipt of the equipment. Although the conductor insulation was most of the loading, the amount varied between enclosures, was limited in total combustible component weight, and separated from the arc location by metal cladding.

Thermal Capacitance Slug (Tcap slug)

Figure 9:
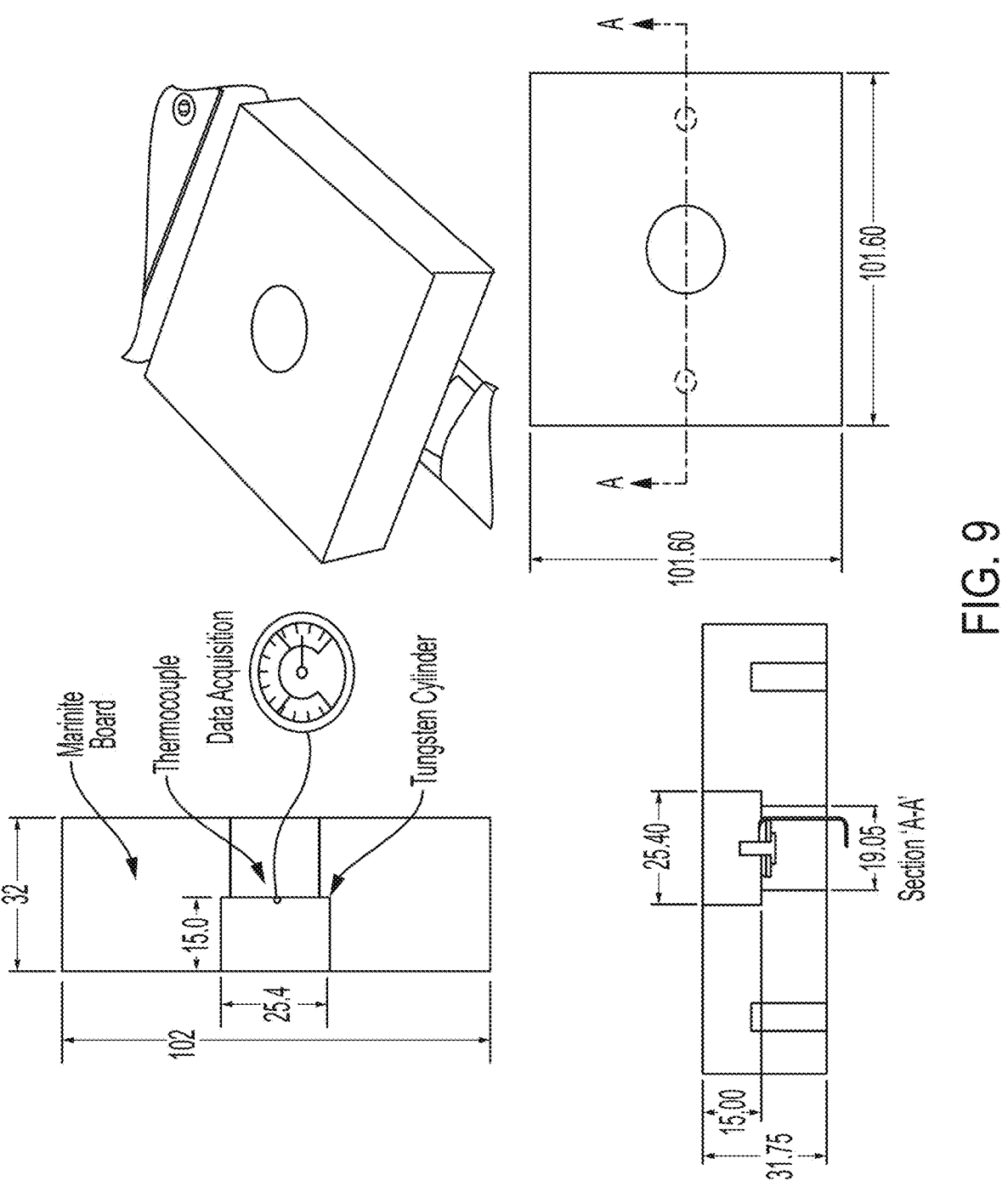
FIG. 9 shows a thermal capacitance slug (top left), photo of device being prepared in the field (top right), and internal construction (bottom left and right) with dimensions in mm, according to the Example.

Tungsten thermal capacitance slugs (Tcap slug) were used to measure the heat flux and incident energy during the HEAF experiment. These sensors were developed as a result of experience gained in Phase 1, where the thermal conditions during some experiments exceeded the measurement capabilities and caused destruction of the ASTM slug calorimeters and modified plate thermometers. A cross section of a Tcap slug is shown in FIG. 9. The slug is composed of a tungsten cylinder approximately 15 mm (0.59 in) long mounted in calcium silicate board. A type-K thermocouple is attached to the rear of the tungsten to measure the temperature during heating. Tungsten has a higher melting point (approximately 3422° C. [6192° F.]) than copper (approximately 1085° C. [1985° F.]) or Inconel (approximately 1400° C. [2552° F.]), while having similar thermal inertia and an order of magnitude higher thermal conductivity than Inconel. These properties increase the survivability of the slug in the harsh HEAF thermal environment while providing good thermal performance. The addition of the Tcap slug to the instrument matrix improves measurement capabilities in severe environments.

The length of the slug was designed based on direct exposure to the HEAF arc jet for the entire expected arc duration. The Phase 1 experiments resulted in a plate thermometer measured heat flux exceeding 3.2 MW/m2. To provide additional dynamic range for the Phase 2 experiments, the Tcap slug was designed to have the capability to measure heat fluxes greater than 5 MW/m2 for 8 s. This design allows for greater thermal exposure over the duration of the experiment for a reasonable level of measurement uncertainty while not over-ranging the device. The Tcap slug was modeled with the Fire Dynamics Simulator (FDS) to determine the optimal length of the metal cylinder. This effort resulted in a 15 mm (0.59 in) long cylinder and a predicted peak temperature of approximately 865° C. at the thermocouple during an 8 s exposure to 5 MW/m2 of external heat flux. Since type-K thermocouples have good performance and are within their specified uncertainty bounds up to approximately 1260° C. (2300° F.), there is additional dynamic range available for more extreme conditions. Further FDS simulations indicated that the maximum useful exposure for the Tcap transducer is a heat flux of 8 MW/m2 for 8 s, which results in a predicted maximum TC temperature of approximately 1295° C. (2363° F.), slightly over-ranging the thermocouple. If the exposure time or arc duration are shorter, larger heat fluxes can be measured. During the experiments described in this Example, the Tcap transducers all survived direct exposure to HEAF arc jets. The only failures that occurred during the experiments related to the Tcap transducers were due to thermal failure of the thermocouple wires in the instrument racks.

The Tcap slugs were heated in the cone calorimeter [18, 29] to verify their performance and the fit of the simple thermal model in Equation (4). The Tcap slugs were tested at 25 kW/m2, 50 kW/m2, and 75 kW/m2 by heating from ambient temperature to an asymptotic temperature approaching steady state and then allowing them to cool.

The maximum heat flux was determined from Equation (4), where ($\dot{q}''$) is the heat flux into the surface of the tungsten slug (kW/m2), $\rho$ is the density of the tungsten slug (kg/m3), ($\overline{C_p}$) is the average heat capacity of the tungsten slug (kJ/[kg·K]), l is the thickness of the slug (m), $\Delta T$ is the change in temperature of the tungsten slug (° C.), and $\Delta t$ is the corresponding change in time (s). The combined standard uncertainty in steady state heat flux measured by the Tcap slugs, composed of Type A uncertainties, is 2.4 percent at 50 kW/m2, The expanded uncertainty in the maximum heat flux measurement is 4.8 percent at 50 kW/m2, with a coverage factor of 2, that corresponds to a confidence interval of 95 percent. These uncertainties were determined by calculating the sample standard deviation of the calculated maximum heat flux values from the cone calorimeter experiments.

$$\dot{q}'' = \rho \cdot \overline{C_P} \cdot l \cdot \left(\frac{\Delta T}{\Delta t}\right) \tag{4}$$

In addition to the uncertainty bounds, a systemic error of approximately −9 percent was present in the 75 kW/m2 experiments. This was likely caused by the observed partial failure of the optical coating applied to the transducers. The coating remained intact during the 25 kW/m2 and 50 kW/m2 experiments but degraded over time during the 75 kW/m2 experiments. Due to the reduced radiative absorptivity as the coating failed, the measured heat flux decreased over the series of 75 kW/m2 experiments. This effect is not expected to affect the full-scale experimental results. Coating failures were not observed during the full-scale experiments, and the high heat fluxes measured in the full-scale experiments were convective dominated (arc jet) and would not be appreciably affected by the change in radiative absorptivity. Even with the radiative absorptivity decreasing over the series of 75 kW/m2 experiments, the calculated expanded uncertainty in the heat flux measurement is 5.9 percent at 75 kW/m2, with a coverage factor of 2, that corresponds to a confidence interval of 95 percent.

The heating of Tcap slugs in the cone calorimeter was modeled with the Fire Dynamics Simulator (FDS) to verify the assumptions and property data and to extrapolate the results to higher heat fluxes than are possible in the cone calorimeter. The heat fluxes of 50 kW/m2 and 5 MW/m2 were examined. During the simulations, the simulated temperature of a thermocouple device at the end of the tungsten slug was recorded during radiant heating. The FDS simulation included both the tungsten slug and the calcium silicate board configured as shown in FIG. 9 without the mounting bores. It also included the temperature dependent values of heat conduction and heat capacity for both tungsten and calcium silicate board. The simulated temperature versus time data was analyzed for maximum heat flux according to the same method as the Tcap slugs in the cone calorimeter and full-scale experiments. The results were compared to the radiant heat flux imposed on the Tcap slug in FDS. It was determined that the calculation of maximum heat flux according to the ASTM E457-08 method is sensitive to the temperature varying heat capacity.

An uncertainty analysis using Type A and Type B components was performed on the Tcap slug at 50 kW/m2 and 5 MW/m2 using the NIST Uncertainty Machine. At a simulated heat flux of 50 kW/m2 the expanded uncertainty was found to be 2.9 percent, with a coverage factor of 2, corresponding to a 95 percent confidence interval. The uncertainty at low heat flux was found to be dominated by the uncertainty in the thermocouple measurement of temperature. At a simulated heat flux of 5 MW/m2 the expanded uncertainty was found to be 2.0 percent, with a coverage factor 1.9, corresponding to a 95 percent confidence interval. The uncertainty at high heat flux was found to be dominated by the uncertainty in the heat capacity of tungsten, which is a function of temperature. In addition to the uncertainty, the high heat flux analysis using FDS simulations showed a systematic error of −8.5 percent, indicating that the heat flux calculated using equation (4) and the ASTM E457-08 approach is 8.5 percent lower than the heat flux absorbed by the surface of the sensor. The Tcap measurement results reported in the tables of this Example have not been corrected for this systematic error.

The experimental uncertainty of incident energy measurements was calculated using simulated data and the NIST Uncertainty Machine, including Type A and Type B components, with a 95 percent confidence interval. The uncertainty ranges from 1.2 percent at 200 kJ/m2 (50 kW/m2 for 4 s) to 0.8 percent at 18.1 MJ/m2 (5 MW/m2 for 4 s). The maximum incident energy seen in the experiments was approximately 7.2 MJ/m2 (2 MW/m2 for 4 s), which is calculated to have an uncertainty of 0.9 percent. In addition to the aforementioned uncertainty, estimates of the heat losses to the calcium silicate portion of the Tcap sensor during simulated exposures resulted in an error of +2.1 percent at 200 kJ/m2 (50 kW/m2 for 4 s) to −4.2 percent at 18.1 MW/m2 (5 MW/m2 for 4 s), with −2.8 percent at 7.2 MJ/m2 (2 MW/m2 for 4 s). The expanded uncertainty of the incident energy over the measurement range is estimated at ±5 percent, with a 95 percent confidence interval, which includes the estimated error due to conduction effects.

Data Acquisition System

Figure 10:
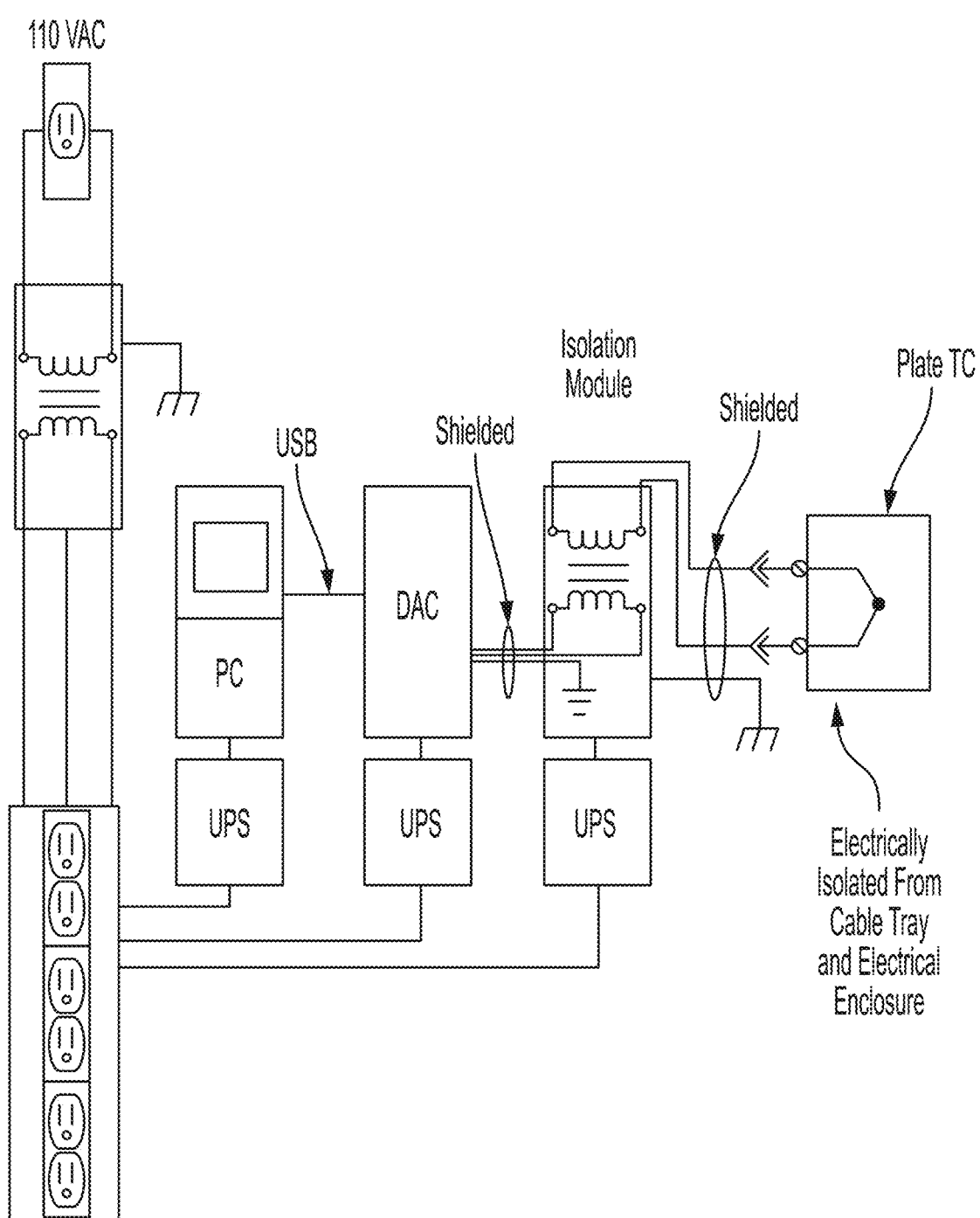
FIG. 10 shows a data acquisition system configuration with EMI rejection, according to the Example.

The NIST data acquisition system used a combination of shielding, grounding, isolation, and system configuration that reduced the impact of electromagnetic interference (EMI), as shown in FIG. 10. This data acquisition system was used for the NIST plate thermometer and Tcap instruments. The NIST data acquisition system was improved for Phase 2 by incorporating non-multiplexed data acquisition, so that each data channel has a dedicated analog to digital converter in addition to a dedicated isolation transformer. This approach was found to reduce measurement errors when an adjacent data channel over-ranged or became an open circuit due to extreme thermal conditions. The isolation module components were housed in two audio equipment rack mount shipping cases along with power supplies and uninterruptable power supplies, one for each half of the data channels. The data acquisition system components were also housed in two audio equipment rack mount shipping cases along with power supplies and uninterruptable power supplies, one for each half of the data channels. All the equipment, including the power supply isolation transformers and data recording PC, was operated in an air-conditioned van parked next to the test cell.

The data acquisition process involved starting the data recording prior to the experiment and stopping after the experiment. Due to the system being located outside of the main control room, the acquisition was manually started, and the operator traveled to the control room for safety. After the experiment was complete and deemed safe for travel back to the data acquisition location, the operator would travel back to the system and stop the recording. Due to the safety procedures, there is significant pre-experiment and post-experiment data recorded. Since the KEMA trigger signal was acquired via the DAQ system, the actual start of the experiment was post processed and the time was adjusted to set the experiment time zero to the actual start of the experiment. For transparency, the DAQ time and experiment time have been reported for each experiment. The difference between these two-time stamps is the time delay between starting the DAQ recording and the start of the experiment. This time delay will be different for each experiment. In addition, the pre- and post-experiment data has been preserved in the data files for purity.

Instrument Deployment

Figure 11:
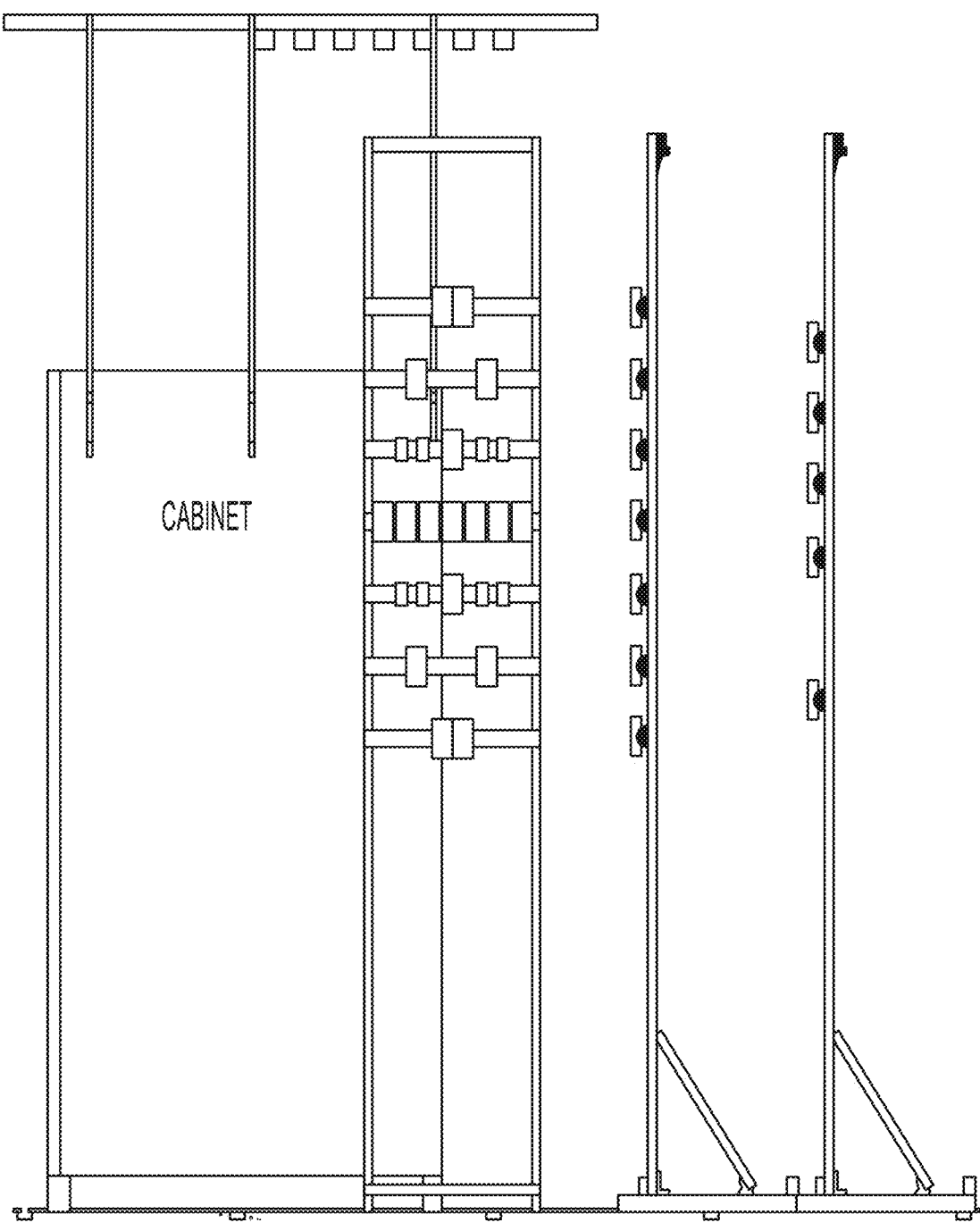
FIG. 11 shows an elevation view of instrument rack configuration around electrical enclosure, according to the Example.
Figure 12:
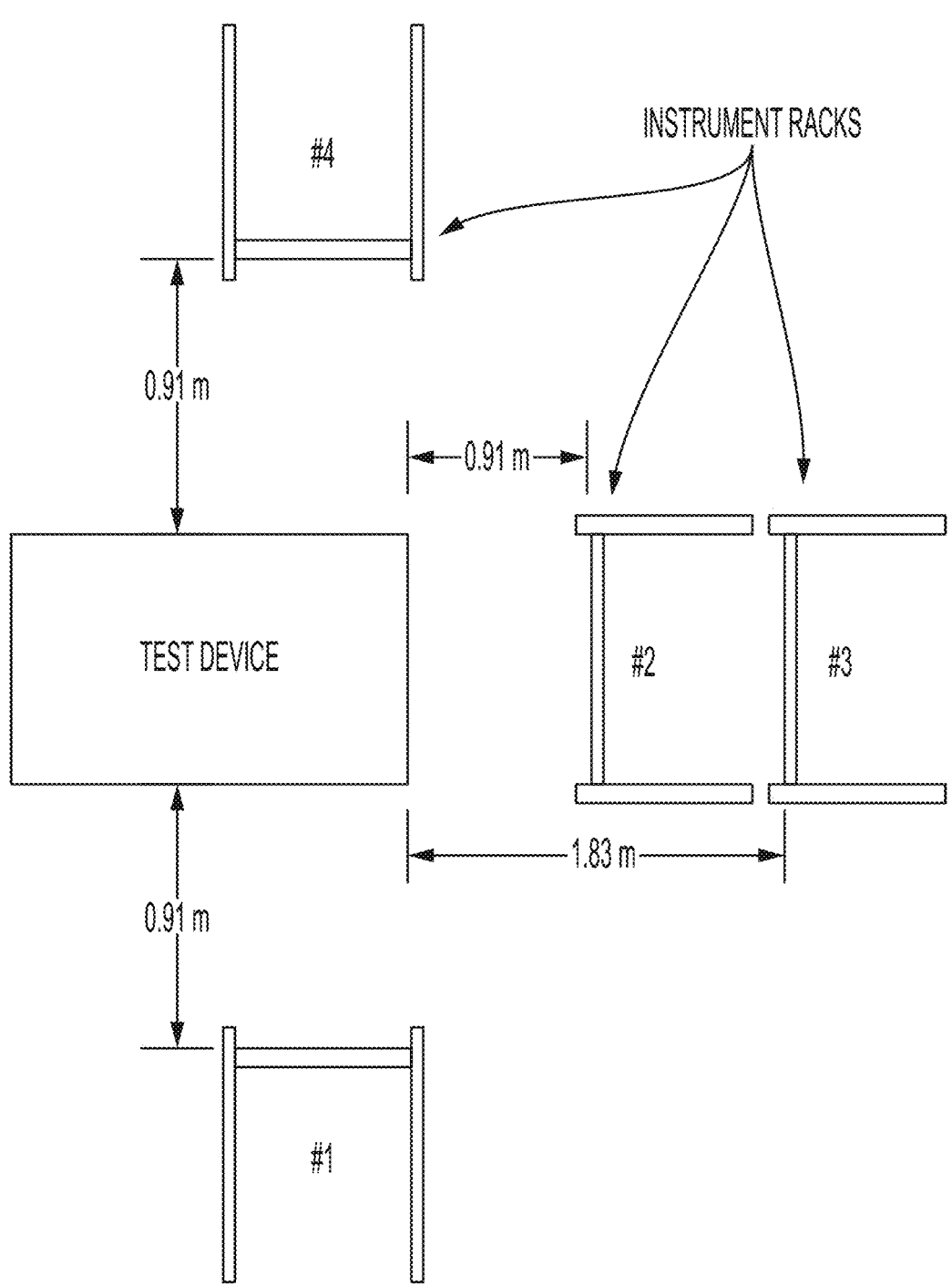
FIG. 12 shows a plan view of instrument rack configuration around electrical enclosure. The enclosure is approximately 0.927 m (36.5 in) wide, 2.019 m (79.5 in) deep, and 2.286 m (90.0 in) tall, according to the Example.
Figure 13:
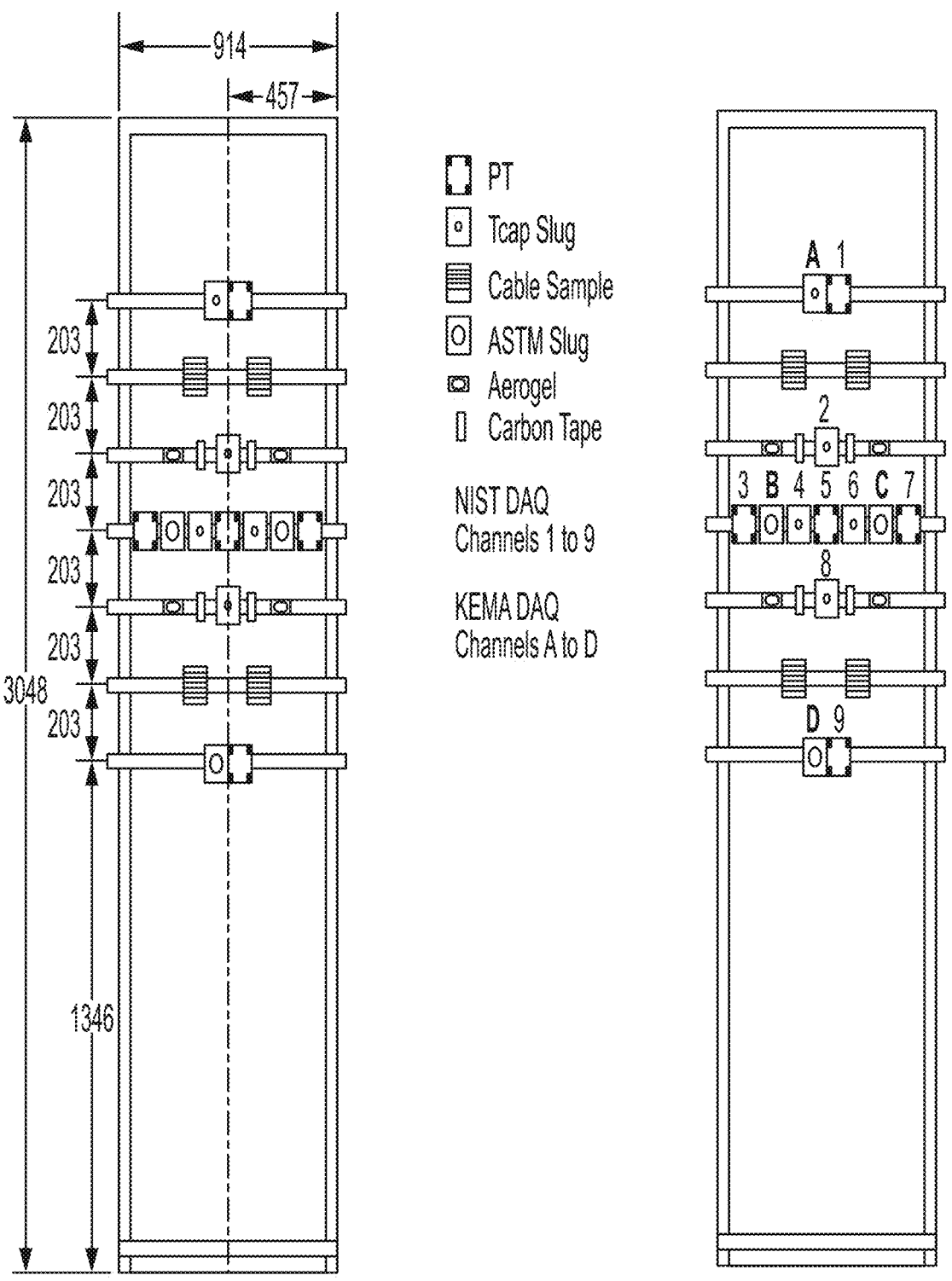
FIG. 13 shows vertical instrumentation rack 1 with data acquisition channels. Dimensions in mm±5 mm, according to the Example.
Figure 14:
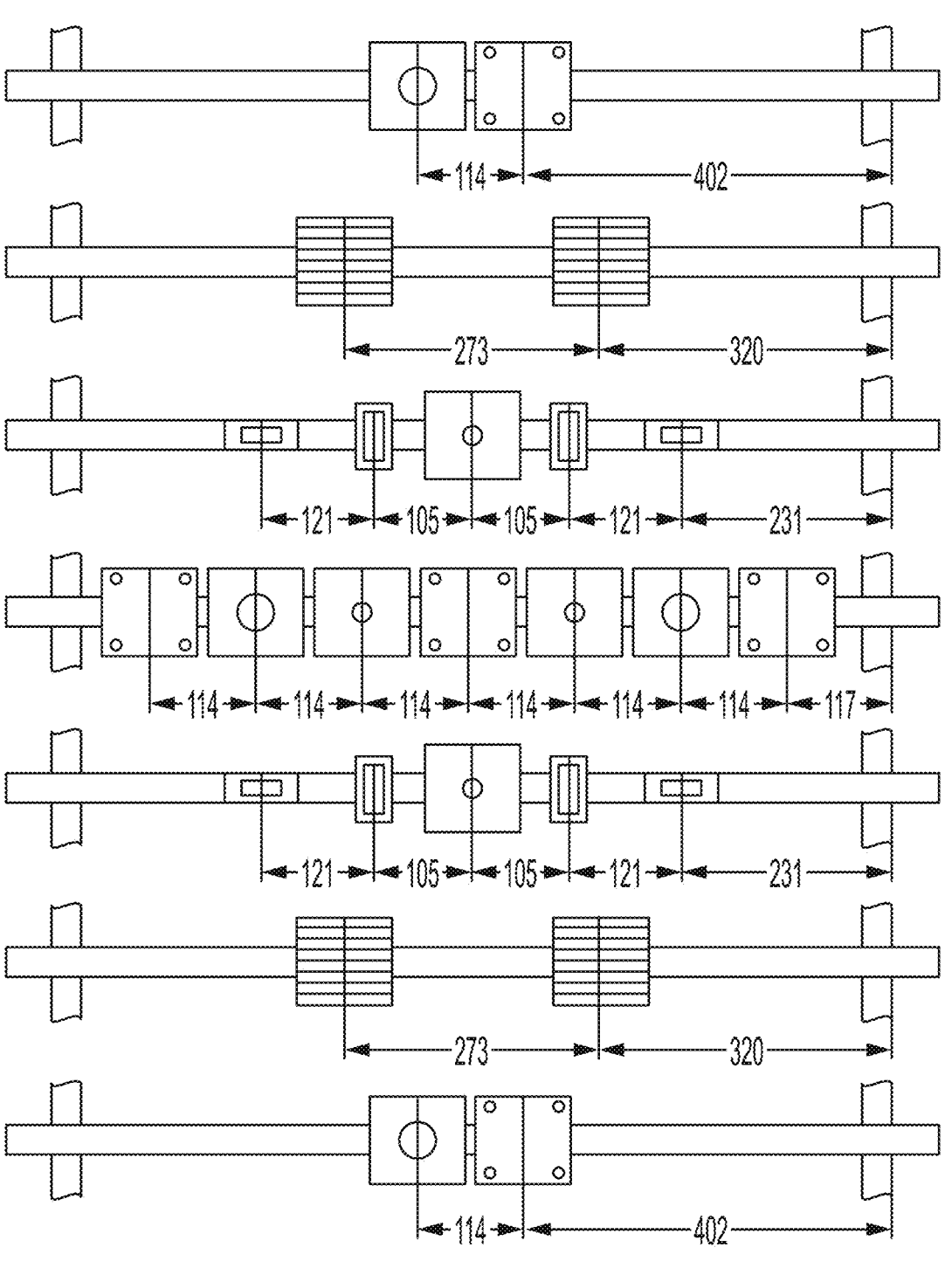
FIG. 14 shows horizontal locations of instruments on instrument racks 1, 2, and 4, according to the Example. Dimensions in mm±5 mm
Figure 15:
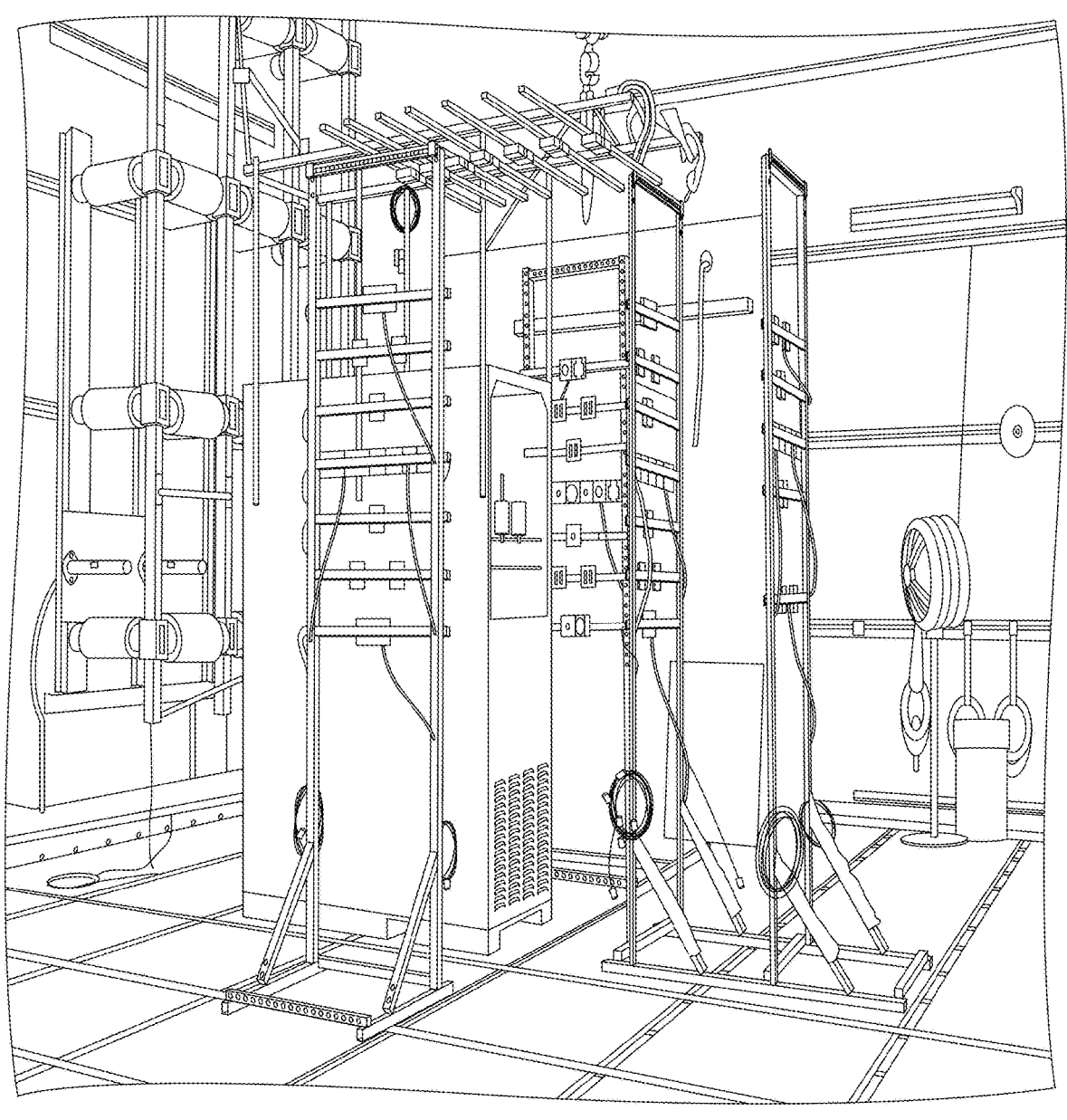
FIG. 15 shows instrumentation racks, according to the Example.

The majority of the thermal instrumentation devices were located on instrument racks with the face of the instrument located approximately 0.91 m (3.00 ft) from the exterior of the metal clad enclosure. One additional instrument rack (Rack 3) was located approximately 1.83 m (6.00 ft) from the expected arc breach side of the electrical enclosure. Rack 3 had a different physical distribution of sensors to prevent shadowing from the sensors located on the instrument rack located between it and the electrical enclosure. Thus, Rack 3 has a slightly different sensor layout than Racks 1, 2, and 4. An instrumentation rack was also located above the electrical enclosure. This instrumentation rack (Rack 5) was secured to the electrical enclosure with 90-degree angle red GPO-3 board (glass reinforced thermoset polyester) and nominal ¼ in-20 fasteners. The sensors on Rack 5 are located approximately 0.91 m (3.00 ft) from the top of the enclosure metal cladding. This instrumentation rack configuration is shown in FIG. 11, Details of the instrument location are shown in FIG. 13, with a photograph showing the instrumentation racks around the test device during setup in FIG. 15. The expanded uncertainty in the measurement of the distances from the instrumentation racks to the electrical enclosure is ±13 mm (0.5 in) with a coverage factor of 2 and an estimated confidence interval of 95 percent.

Experimental Results

The testing laboratory performed calibration runs to ensure that the power circuits selected met the experimental program needs. The calibrations are measured at a shorting bus within the laboratory's facility and the actual experimental conditions will be slightly different because of the additional circuit length to the test equipment and that of the test equipment. For the 25 kA experiment, calibrations were run, with final calibration values of 6.89 kV and 29.2 kA. The uncertainty of the testing laboratory reported values, considering the total measuring system, is less than 3 percent. For the 32 kA experiment, the final calibration values were 7.0 kV and 33.0 kA. Target and actual experimental parameters are shown in Table 1.

As is shown, the actual arc current is less than that of the calibration. The added circuit length, arc impedance and finite power circuit configuration places some constrains on achieving the exact specified parameters. The nominal target experiment durations were either 2 s or 4 s. The duration of the arc is controlled by the ability to maintain the arc within the enclosure and the breaking of the circuit by the test laboratory protective device(s). Provided that the arc does not prematurely extinguish prior to the desired arc time, the testing laboratory ensures that the arc duration parameter is met by automatically triggering their protectives devices to open at the specified duration. Because there is a delay in the opening of the circuit (breaker opening time), the actual durations are longer than the desired durations. For these experiments, the maximum durations were no more than 3.75 percent longer than the planned durations (2 s or 4 s). The frequency of the power source was selected consistent with the US power grid (i.e., 60 Hz). Because the electrical power source is the generator's inertia, the frequency decreases during the experiment. The uncertainty of the testing laboratory reported values, considering the total measuring system, is less than 3 percent. The actual experimental parameters (system voltage, current, and arc time) were close to the targets, with the maximum differences being no more than 7 percent.

TABLE 1

| Test | System Voltage (kV$_{L-L}$) | | | Current (kA) | | Frequency (Hz) | | | Arc Duration (sec) | |
|---|---|---|---|---|---|---|---|---|---|---|
| No. | Target | Actual | Arc | Target | Actual | Target | Start | End | Target | Actual |
| 2-19 | 6.9 | 6.9 | 0.772 | 25 | 25.76 | 60.0 | 60.0 | 55.6 | 2.0 | 2.05 |
| 2-21 | 6.9 | 6.9 | 0.826 | 25 | 26.57 | 60.0 | 60.3 | 46.2 | 4.0 | 4.11 |
| 2-22 | 6.9 | 7.0 | 0.873 | 32 | 31.97 | 60.0 | 60.3 | 52.6 | 2.0 | 2.07 |
| 2-24 | 6.9 | 7.0 | 0.937 | 32 | 29.84 | 60.0 | 60.0 | 42.3 | 4.0 | 4.15 |

During the experimental plan public comment period, one potential concern was related to the test facility's ability to ensure the "peak" asymmetrical fault current (typically first ½ cycle) not exceed the rating for the cabinet. Based on the experimental data reported in subsequent sections, the asymmetrical current during the experiments did not exceed the cabinet rating per IEEE C37.010-1999. Experimental conditions and comparisons of experimental current ratios to the standard ratio are presented in Table 2.

TABLE 2

| Test No. | Test Voltage (kV) | Test Current (kA rms) | Target Arc Duration (s) | Asymmetrical ½ cycle current (kA Peak, absolute) | IEEE C37.010-1999 ratio (≤2.60) |
|---|---|---|---|---|---|
| 2-19 | 6.9 | 25.8 | 2 | 63.0 | 2.44 |
| 2-21 | 6.9 | 26.6 | 4 | 62.9 | 2.38 |
| 2-22 | 7.0 | 32.0 | 2 | 75.9 | 2.42 |
| 2-24 | 7.0 | 30.2 | 4 | 75.0 | 2.48 |

Test 2-19—6.9 kV, 25 kA, 2 s Duration, Aluminum Bus

Test 2-19 was performed with the temperature approximately 18° C. (65° F.), approximately 97 percent relative humidity and approximately 102.1 kPa of pressure. The weather was overcast with light rain and an east-northeast wind at approximately 13 km/h (8 mi/h).

Observations

Figure 16:
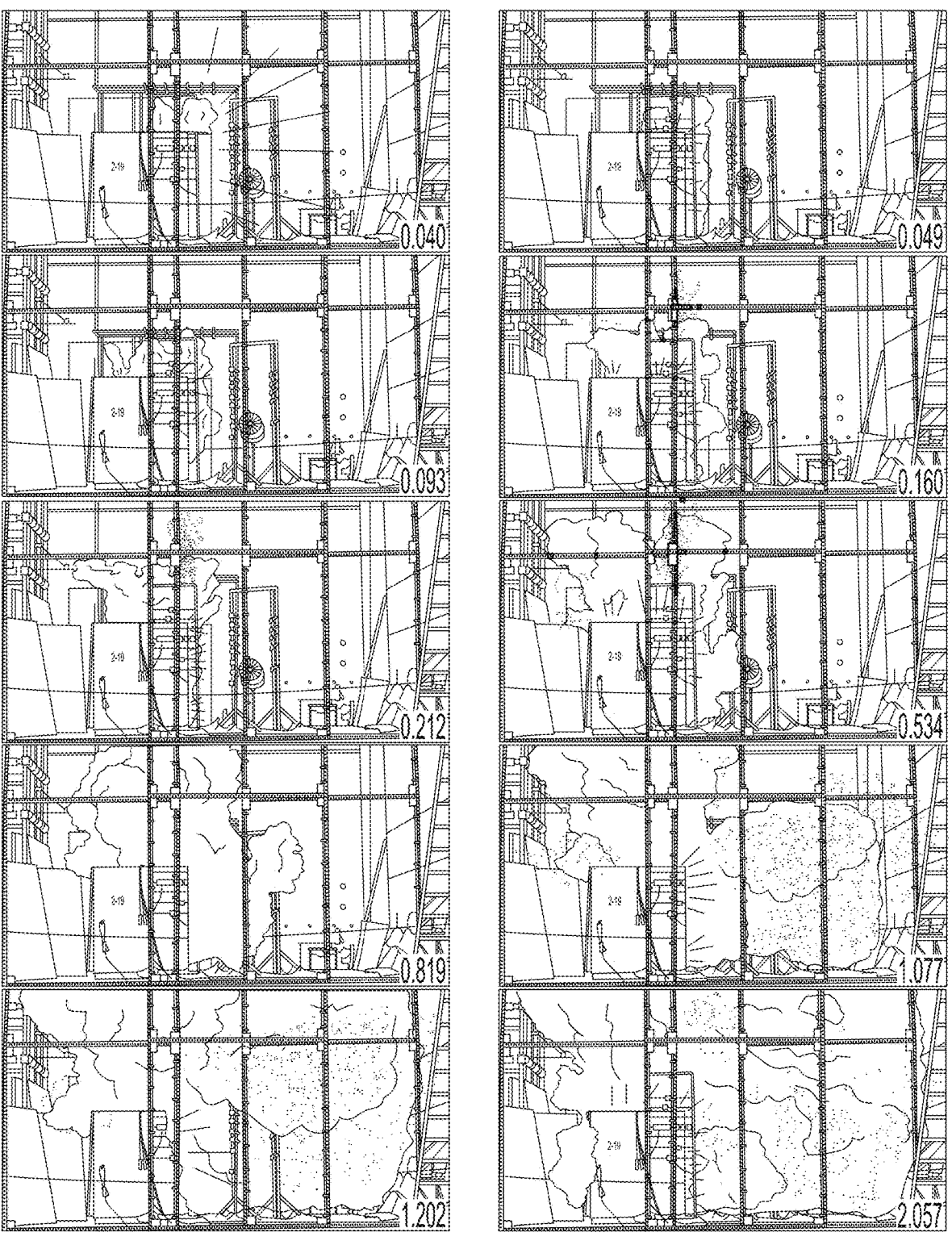
FIG. 16 shows sequence of images from Test 2-19 (image time stamp in seconds), according to the Example.
Figure 17:
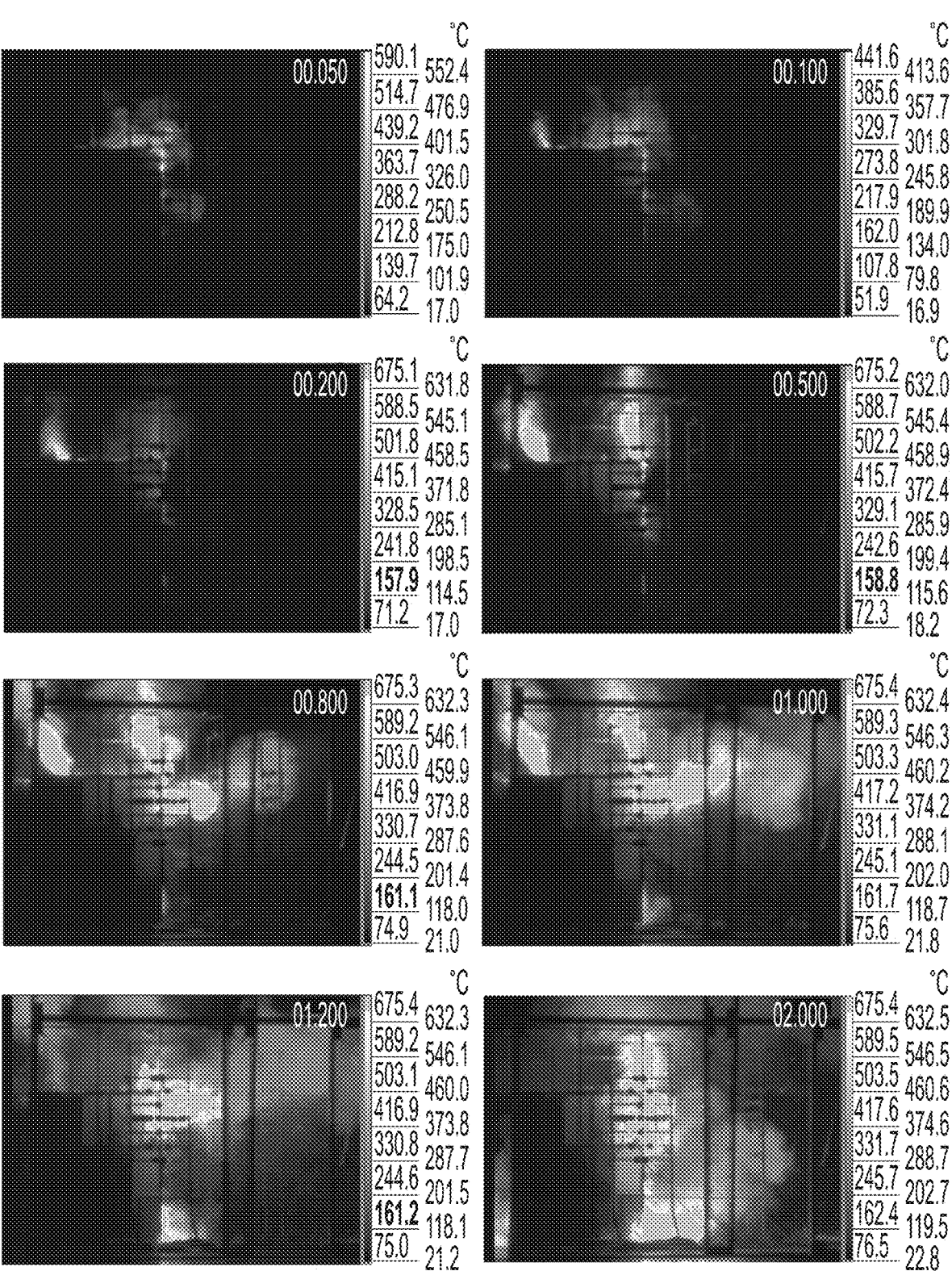
FIG. 17 shows sequence of thermal images from Test 2-19 (image time stamp in seconds), according to the Example.

Observations documented below are based on review of video and thermal imaging that was taken during the experiment. The observations provided in Table 3 include an approximate time reference. Corresponding images are provided in FIG. 16.

TABLE 3

| Time (ms) | Observation |
|---|---|
| 40 | Bottom of front door begins to open |
| 49 | Particle ejecta reaches top rack (0.91 m [3.00 ft] above enclosure) |
| 49 | Particle ejecta passes rear rack (rack #2 at 0.91 m [3.00 ft] behind enclosure) |
| 93 | Front door no longer secured by latch (continues to open) |
| 160 | Particle ejecta passes 1.83 m [6.00 ft] above enclosure |
| 212 | Particle ejecta passes 2$^{nd}$ rear rack (rack #3 at 1.83 m [6.00 ft] behind enclosure) |
| 534 | Initial arc breach of rear panel |
| 819 | Particle ejecta impacts test facility cell wall (5.18 m [17.00 ft] behind enclosure) |
| 1 077 | Top front vent stops emitting hot gas and particle ejecta |
| 1 200 | Significant quantity of particle ejecta impacting test facility cell wall behind enclosure |
| 2 057 | Decrease in cell illumination consistent with experiment termination |
| 276 000 | Test cell pedestal ventilation fan turned on |
| 613 018 | NIST data acquisition ends |

Figure 18:
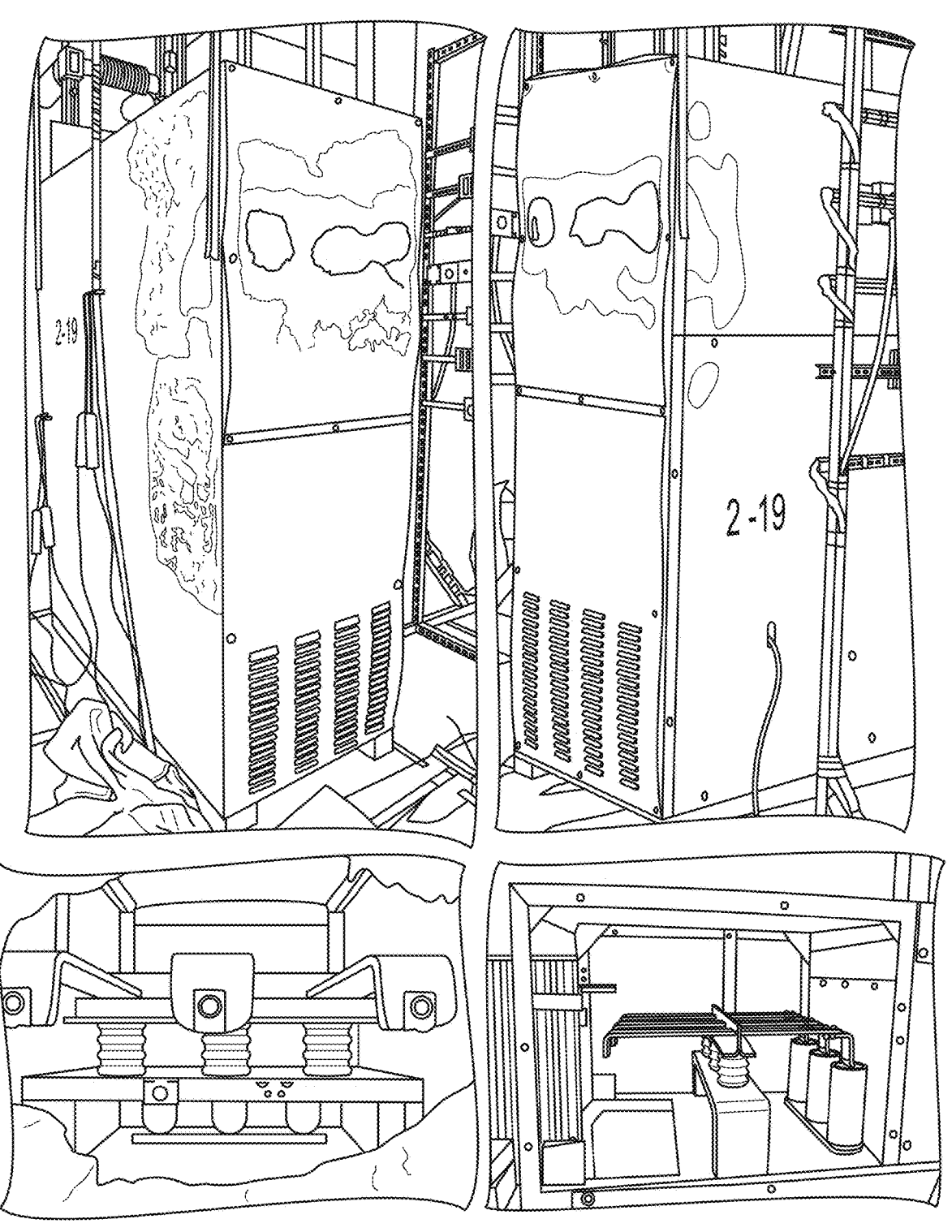
FIG. 18 shows Enclosure Post-Test 2-19. (Top: back of enclosure; Bottom: remaining bus bar material. Bottom left as viewed from rear of enclosure, bottom right as viewed from the side at the rear of the enclosure with the side panel removed.), according to the Example.

Photographs of damage to the electrical enclosure are shown in FIG. 18. The enclosure experienced a breach of the upper rear panel and one small breach on each of the side rear panels of the primary cable connection compartment. These were the only panels to exhibit openings caused by the arc. However, there was evidence of excessive heating of the bus-side upper panel. The door on the front of the enclosure with a single quarter-turn latch did open, It was observed that internal pressure caused the bottom of the door to push out and post-experiment inspection indicated that the side of the panel was bowed. The combination of these two effects allowed the latch mechanism to slip and the door to open. Following the experiment, no apparent evidence of aluminum oxide coating was observed on the test cell walls. Post-experiment photographs of the electrical enclosure are shown in FIG. 18.

Measurements

Measurements made during Test 2-19 are presented below. These measurements include;

Thermal

Heat flux—Plate Thermometers

Incident energy—ASTM Slug calorimeter

Heat flux, incident energy—Tcap Slug calorimeter

Pressure

Internal pressure

Mass Loss

Pre-/Post-experiment measurements

Electrical

Voltage profiles

Current profiles

Power/Energy profiles

Thermal Measurements

Thermal measurements from the active instruments are reported below for Test 2-19. These include PT measurements, ASTM Slug calorimeter measurements, and Tcap slug measurements in Table 4. The maximum reading is identified with bold text. Significant amounts of incident energy (kJ/m2) were transferred to areas surrounding the switch gear during the post-arcing phase of the HEAF. This is especially evident for the Tcap slugs (13, 16, 18) located approximately 0.91 m (3.00 ft) from the switchgear on the right side of the test cell where the arc penetrated the rear panel of the switchgear. The post-arcing phase incident energy contribution was multiple times greater than the incident energy contribution from the arcing phase.

Several failures of the ASTM calorimeters were noted. The calorimeters connected to the data acquisition system channels A2-A8 (Instruments A-D, M, N and P) did not capture any temperature data during the experiment due to a system error. The error reporting log identified that a connection error occurred between the start of the experiment and the end. calorimeters connected to Instruments G and Q show normal ambient temperatures, however, immediately after the arc begins, the temperature readings go negative.

TABLE 4

| Rack No. | T_cap No. | Location | Heat Flux During Arc (kW/m²) ± 2.9% | Incident Energy During Arc Phase (kJ/m²) ± 5% | Total Incident Energy (kJ/m²) ± 5% |
|---|---|---|---|---|---|
| 1 | 2 | Top | 41.3 | 93.8 | 459.8 |
| 1 | 4 | Mid-Right | 43.5 | 101.0 | 540.1 |
| 1 | 6 | Mid-Left | 33.3 | 80.5 | 511.1 |
| 1 | 8 | Bottom | 35.4 | 73.5 | 532.7 |
| 2 | 11 | Top | 115.3 | 260.3 | 1 132.1 |
| 2 | 13 | Mid-Right | 131.3 | 297.1 | 1 353.4 |
| 2 | 15 | Mid-Left | 144.1 | 309.5 | 1 270.0 |
| 2 | 17 | Bottom | 136.3 | 298.9 | 1 257.0 |
| 3 | 20 | Top | 39.8 | 90.2 | 309.4 |
| 3 | 22 | Mid-Right | 38.8 | 79.1 | 326.1 |
| 3 | 24 | Mid-Left | 42.3 | 88.9 | 312.8 |
| 3 | 26 | Bottom | 22.2 | 50.1 | 307.0 |
| 4 | 29 | Top | 59.0 | 116.0 | 506.7 |
| 4 | 31 | Mid-Right | 39.0 | 66.1 | 534.7 |
| 4 | 33 | Mid-Left | 76.5 | 145.1 | 634.7 |
| 4 | 35 | Bottom | 28.8 | 56.0 | 556.6 |
| 5 | 38 | Front | 101.2 | 188.6 | 524.5 |
| 5 | 40 | Center-Right | 140.7 | 232.0 | 533.2 |
| 5 | 42 | Center-Left | 83.9 | 151.5 | 515.7 |
| 5 | 44 | Back | 75.6 | 105.1 | 427.0 |

Test 2-21—6.9 kV, 25 kA, 4 s Duration, Aluminum Bus

Test 2-21 was performed with the temperature approximately 24° C. (75 ° F.), approximately 85 percent relative humidity and approximately 102.5 kPa of pressure, The weather was overcast with zero precipitation and an east wind at approximately 11 km/h (7 mi/h).

Observations

Figure 19:
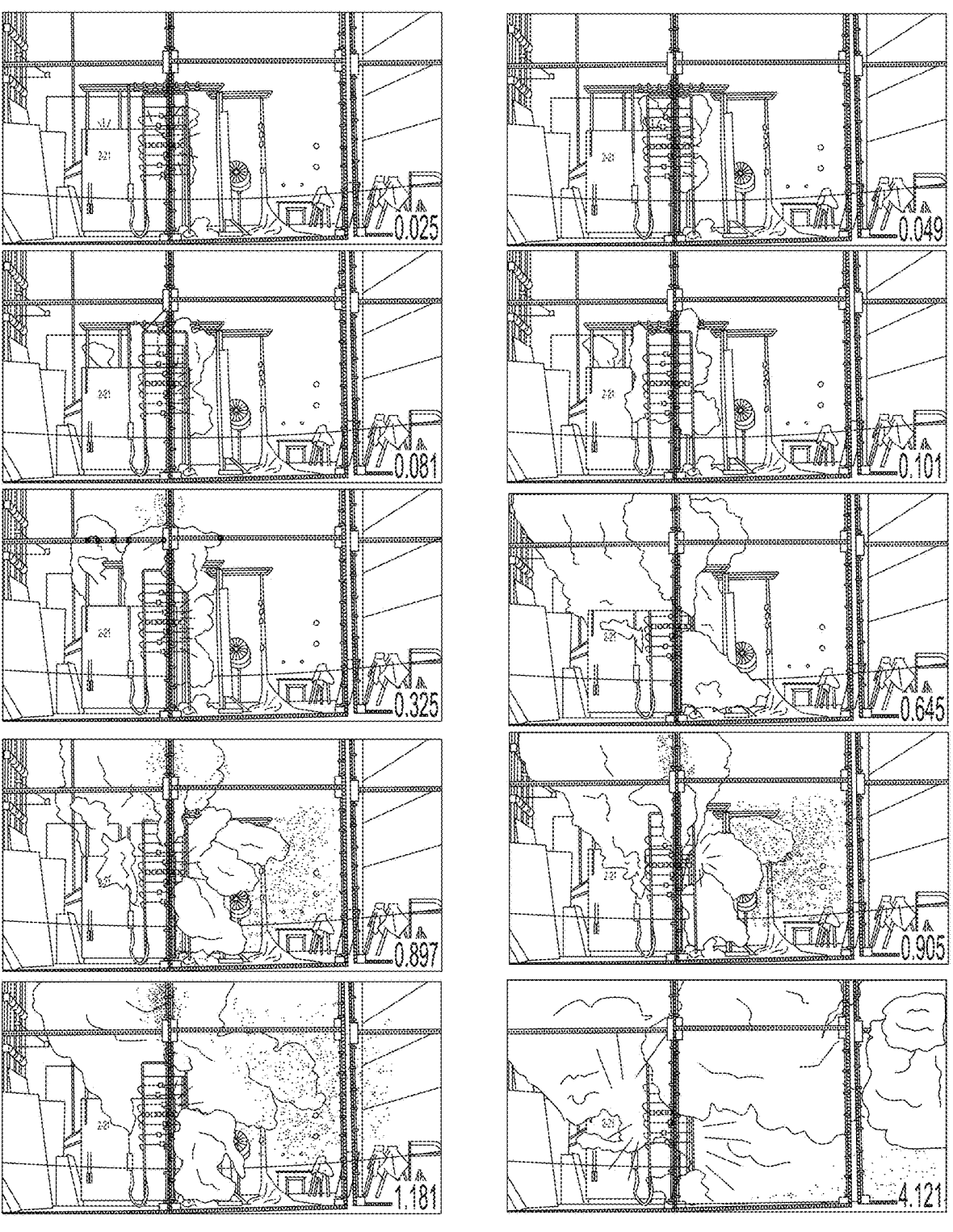
FIG. 19 shows sequence of images for Test 2-21 (image time stamp in seconds) according to the Example.
Figure 20:
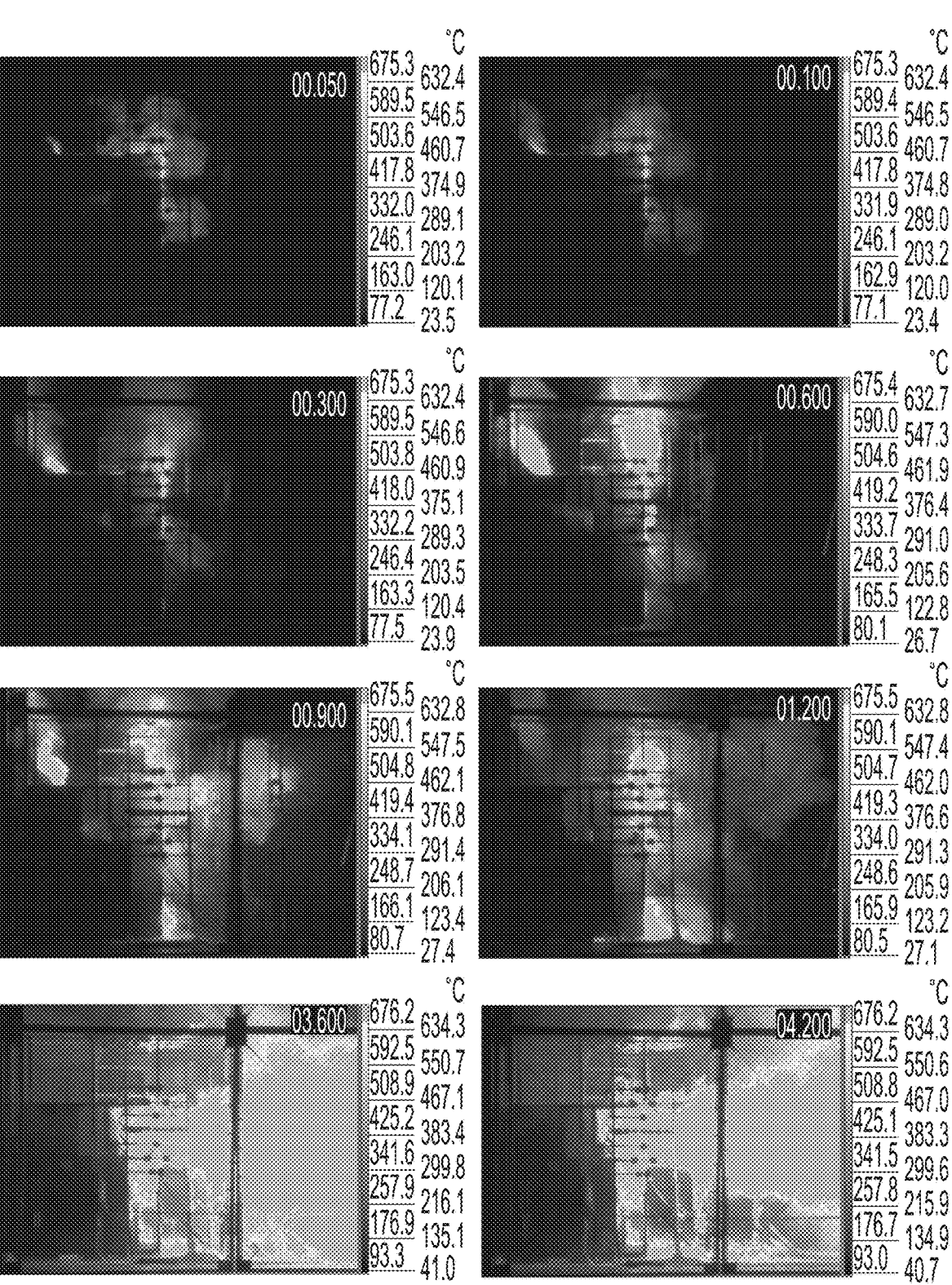
FIG. 20 shows sequence of thermal images from Test 2-21 (image time stamp in seconds), according to the Example.

Observations documented below are based on review of video and thermal imaging that was taken during the experiment. The observations provided in Table 5 include an approximate time reference. Corresponding images are provided in FIG. 19. Thermal images are presented in FIG. 20.

TABLE 5

| Time (ms) | Observation |
|---|---|
| 25 | Bottom of front door begins to open |
| 49 | Particle eject reaches top rack (0.91 m [3.00 ft] above enclosure) |
| 81 | Particle ejecta passes rear rack (rack #2 at 0.91 m [3.00 ft] behind enclosure) |
| 101 | Front door no longer secured by latch (continues to open) |
| 101 | Particle eject passes 1.83 m [6.00 ft] above enclosure |
| 325 | Particle ejecta passes 2nd rear rack (rack #3 at 1.83 m [6.00 ft] behind enclosure) |
| 645 | Initial arc breach of rear panel |
| 897 | Particle ejecta impacts test facility cell wall (5.18 m [17.00 ft] behind enclosure) |
| 905 | Top front vent stops emitting hot gas and particle ejecta |
| 1 181 | Significant quantity of particle ejecta impacting test facility cell wall behind enclosure |
| 4 121 | Decrease in cell illumination consistent with experiment termination |
| 151 000 | Test cell pedestal ventilation fan turned on |
| 803 077 | NIST data acquisition ends |

Figure 21:
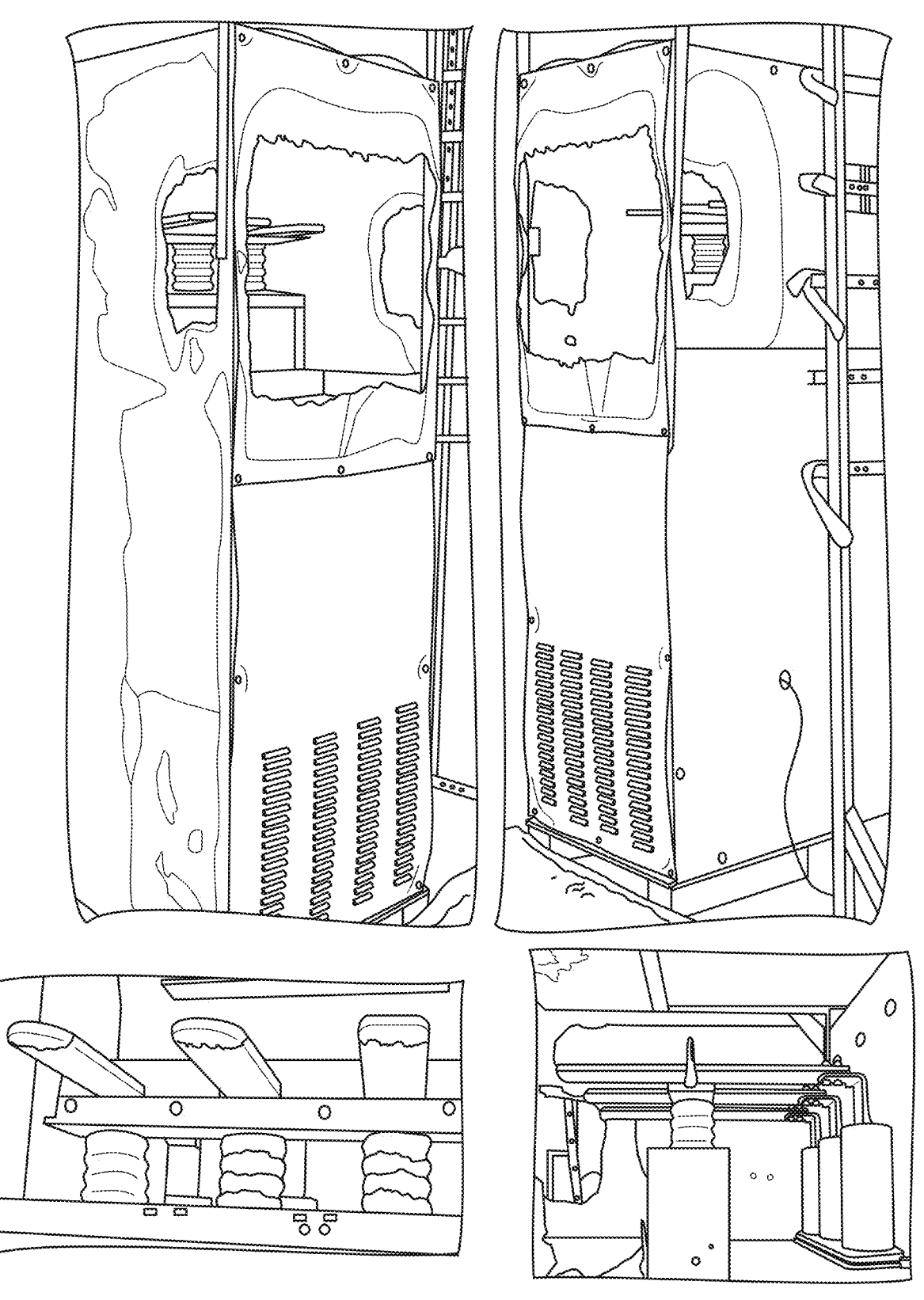
FIG. 21 shows Enclosure Post-Test 2-21. (Top: back of enclosure; Bottom: remaining bus bar material. Bottom left as viewed from rear of enclosure, bottom right as viewed from the side at the rear of the enclosure with the side panel removed.), according to the Example.

Photographs of damage to the electrical enclosure are shown in FIG. 21. The enclosure breached at the upper rear panel of the primary cable connection compartment. There were also breaches on both sides of the enclosure adjacent to the breach on the upper rear panel. The door on the front of the enclosure with a single quarter turn latch opened during the experiment. As in Test 2-19, internal pressure caused the bottom of the door to push out and the post-experiment inspection indicated that the side of the panel was bowed outward, The combination of these two effects allowed the latch mechanism to slip and the door to open.

Figure 8:
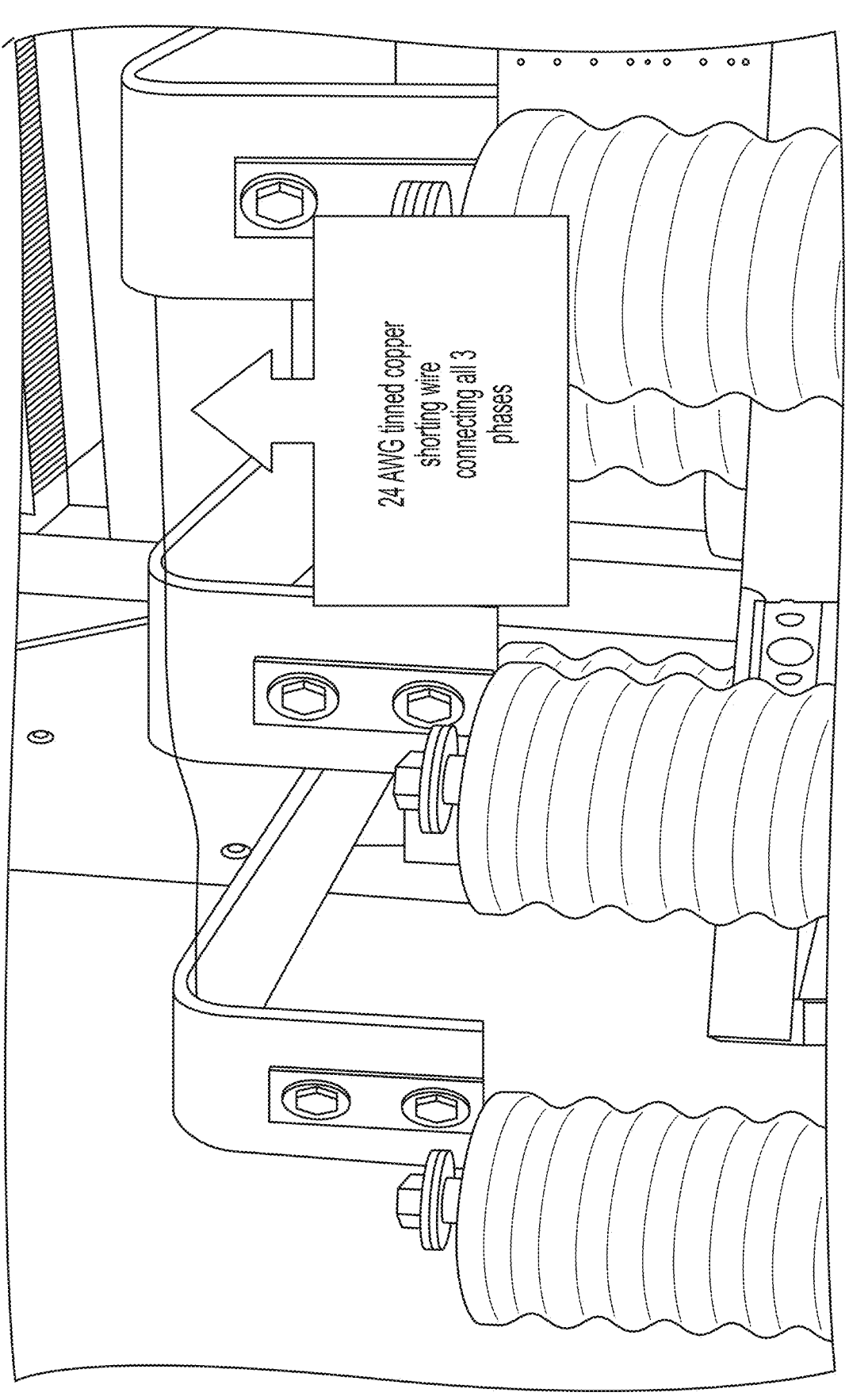
FIG. 8 shows a photograph of tinned copper wire used to create a short, according to the Example.

The instrumentation Rack #2 located approximately 091 m (3.00 ft) from the rear of the enclosure sustained damage to one of the horizontal DIN rails. One DIN rail on Rack #2 was severed. Aluminum and steel byproducts were observed on all instrumentation racks and the cameras located near the cell wall. The amount was less than that observed in Test 2-24. Due to Test 2-24 being performed sequentially before this Test 2-21, the amount of aluminum oxide on the test cell surfaces is difficult to characterize from observation. Within the electrical enclosure, there were puddles of solidified aluminum on the enclosure floor. This was later determined to be the aluminum from the rear electrical insulators supporting the bus bars directly below the location of the shorting wire. These insulators are shown in FIG. 8 prior to the experiment.

Measurements

Measurements made during Test 2-21 are the same as made in Test 2-19. Measurements are reported below.

Thermal Measurements

Figure 22:
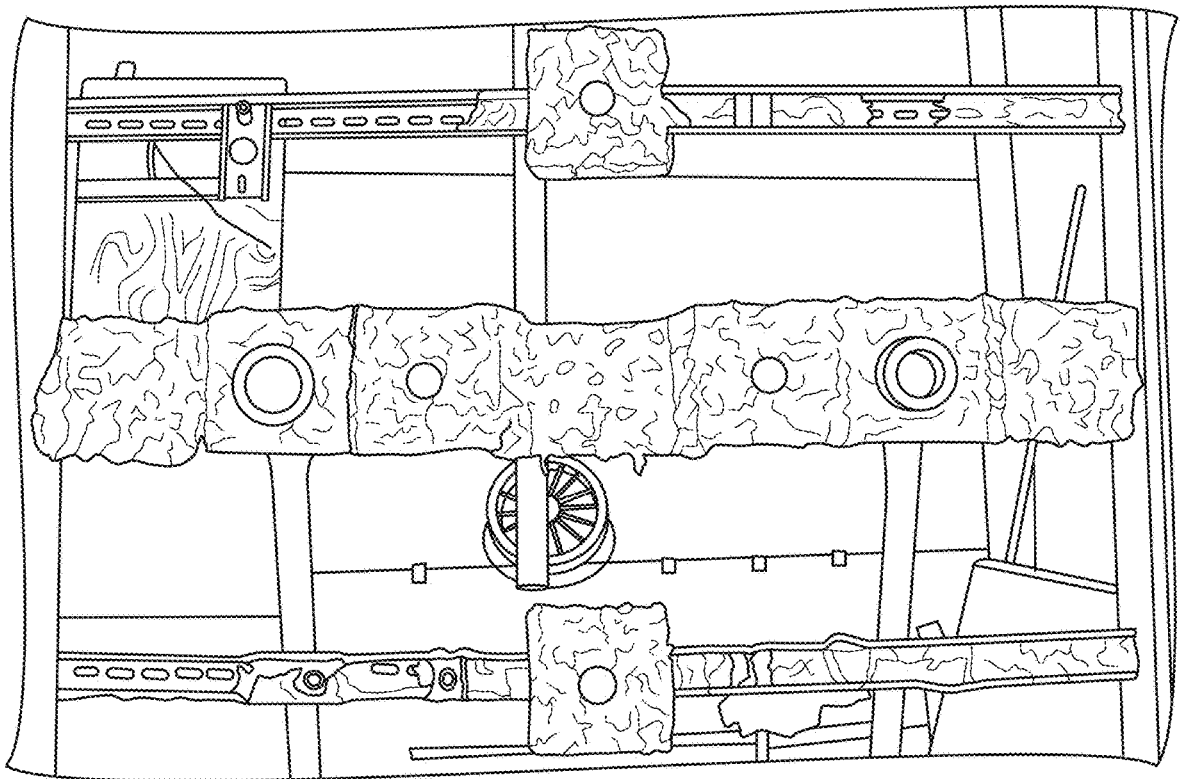
FIG. 22 damage to central instruments (Rack #2—0.91 m rear), according to the Example.

This experiment resulted in physical damage to several thermal instruments located directly behind the test device. FIG. 22 shows the damage to Rack #2 which is located approximately 0.91 m (3.00 ft) from the back of the enclosure. The central rail (middle in photo) showed damage to four instruments. The Inconel on the center plate TC is completely gone, and the outer plate TCs show partial destruction of the Inconel. The right (in photo) ASTM slug calorimeter was damaged, and the copper slug was not present after the experiment.

Significant amounts of incident energy (kJ/m2), as measured by the Tcap slugs, were transferred to areas surrounding the switchgear during the post-arcing phase of the HEAF. For this experiment, the effect is most evident in areas on the top and sides of the switchgear rather than near the rear of the switchgear where the arc jet penetrated the rear panel. In the area where the arc jet penetrated the rear panel (Tcap 11 through Tcap 26), most of the incident energy contribution occurred during the arcing phase of the HEAF.

TABLE 6

| | | | | | |
|---|---|---|---|---|---|
| Summary of Tcap Slug Measurement, Test 2-21 | | | | | |
| Rack No. | T_cap No. | Location | Heat Flux During Arc (kW/m²) ± 2.9% | Incident Energy During Arc Phase (kJ/m²) ± 5% | Total Incident Energy (kJ/m²) ± 5% |
| 1 | 2 | Top | 550.7 | 1 156.9 | 1 397.1 |
| 1 | 4 | Mid-Right | 521.9 | 1 112.4 | 1 635.9 |
| 1 | 6 | Mid-Left | 446.6 | 972.0 | 1 296.3 |
| 1 | 8 | Bottom | 461.2 | 986.0 | 1 455.4 |
| 2 | 11 | Top | 3 318.4 | 5 610.8 | 5 901.6 |
| 2 | 13 | Mid-Right | 6 741.4 | 6 219.9 | 6 987.5 |
| 2 | 15 | Mid-Left | 3 422.0 | 6 567.6 | 6 861.0 |
| 2 | 17 | Bottom | 3 509.2 | 7 162.8 | 7 790.5 |
| 3 | 20 | Top | 1 034.0 | 1 974.1 | 2 270.6 |
| 3 | 22 | Mid-Right | 1 090.7 | 2 200.3 | 2 703.2 |
| 3 | 24 | Mid-Left | 1 133.3 | 2 181.9 | 2 638.1 |
| 3 | 26 | Bottom | 1 557.5 | 2 995.1 | 3 346.5 |
| 4 | 29 | Top | 284.8 | 652.5 | 1 192.4 |
| 4 | 31 | Mid-Right | 299.3 | 696.0 | 1 142.2 |
| 4 | 33 | Mid-Left | 355.1 | 882.6 | 1 491.2 |
| 4 | 35 | Bottom | 322.7 | 779.4 | 1 282.2 |

TABLE 6-continued

Summary of Tcap Slug Measurement, Test 2-21

| Rack No. | $T_{cap}$ No. | Location | Heat Flux During Arc (kW/m²) ± 2.9% | Incident Energy During Arc Phase (kJ/m²) ± 5% | Total Incident Energy (kJ/m²) ± 5% |
|------|------|-------------|-------|-------|---------|
| 5 | 38 | Front | 492.2 | 983.9 | 1 292.6 |
| 5 | 40 | Center-Right | 343.2 | 818.3 | 1 084.9 |
| 5 | 42 | Center-Left | 304.3 | 678.1 | 1 082.7 |
| 5 | 44 | Back | 203.0 | 446.1 | 845.1 |

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through mufti-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an" and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

PARTS LIST high energy arc-compatible thermal capacitance sensor 200
thermally capacitive slug 201
exposed high energy arc receiver surface 202
hidden thermal energy transfer surface 203
mounting surface 204
refractory insulation member 205
thermal energy 206
heat flux and incident energy 207
plasma jet 208
refractory metal 209
high energy arc event 210
electrical equipment 211
electrical conductor 212
gap 213
temperature reader 214
thermal energy analyzer 215
thermal energy data 216
thermal energy analysis result 217
slug receptacle 218
output interface aperture 219
event-facing surface 220
anterior surface 221
longitudinal bulwark 222
aperture wall 223
receptacle wall 224
fastener 225
fastener receiver 226
electrically insulating spacer 227
mechanical load distributor 228
mounting member 229

What is claimed is:

1. A high energy arc-compatible thermal capacitance sensor for measuring heat flux and incident energy of a high energy arc event, the high energy arc-compatible thermal capacitance sensor comprising:
 a thermally capacitive slug comprising:
  a refractory metal that nondestructively withstands changes in shape, volume, and mass while being subjected to a plasma jet from a high energy arc event for a duration of exposure time of at least 8 seconds and at least 10,000° C. or at least 8 MW/m$^2$;
  an exposed high energy arc receiver surface that receives heat flux and incident energy from the plasma jet and produces thermal energy from receiving the heat flux and incident energy;

a hidden thermal energy transfer surface arranged relative to the exposed high energy arc receiver surface so that the hidden thermal energy transfer surface is not exposed to the plasma jet and the heat flux and incident energy and so that the hidden thermal energy transfer surface receives the thermal energy from the exposed high energy arc receiver surface, wherein the thermal energy is communicated from the exposed high energy arc receiver surface to the hidden thermal energy transfer surface through the refractory metal, wherein a refractory insulation member blocks the plasma jet and the heat flux and incident energy from the hidden thermal energy transfer surface; and
  a mounting surface that mechanically engages the refractory insulation member such that the mounting surface is interposed between the exposed high energy arc receiver surface and the hidden thermal energy transfer surface, and such that the mounting surface is not exposed to the plasma jet and the heat flux and incident energy by the refractory insulation member that blocks the mounting surface from the plasma jet and the heat flux and incident energy;
 the refractory insulation member in which the thermally capacitive slug is disposed and comprising:
  a slug receptacle bounded by a receptacle wall and that receives the thermally capacitive slug such that the receptacle wall mechanically engages the mounting surface of the thermally capacitive slug and fixes a position of the mounting surface of the thermally capacitive slug; and
  an output interface aperture bounded by an aperture wall and that provides communication between a temperature reader disposed on the hidden thermal energy transfer surface of the thermally capacitive slug and a thermal energy analyzer such that thermal energy data is communicable from the temperature reader to the thermal energy analyzer; and
 the temperature reader disposed on the hidden thermal energy transfer surface of the thermally capacitive slug and in thermal communication with the hidden thermal energy transfer surface and that measures a temperature of the hidden thermal energy transfer surface such that the temperature reader:
  is not exposed to the plasma jet and the heat flux and incident energy by the refractory insulation member that blocks the temperature reader from the plasma jet and the heat flux and incident energy;
  receives the thermal energy from the hidden thermal energy transfer surface; and
  produces the thermal energy data from the thermal energy such that the heat flux and incident energy of the high energy arc event is determinable from the thermal energy data.

2. The high energy arc-compatible thermal capacitance sensor of claim 1, wherein the refractory metal of the thermally capacitive slug comprises tungsten.

3. The high energy arc-compatible thermal capacitance sensor of claim 1, wherein the thermally capacitive slug further comprises a cylindrical shape.

4. The high energy arc-compatible thermal capacitance sensor of claim 1, wherein the temperature reader comprises a thermocouple, a resistance temperature detector, a thermometer, a thermistor, or a combination comprising at least one of the foregoing temperature readers.

5. The high energy arc-compatible thermal capacitance sensor of claim 1, wherein the refractory insulation member further comprises a mounting member to mount the high energy arc-compatible thermal capacitance sensor to a support structure.

6. The high energy arc-compatible thermal capacitance sensor of claim 1, wherein the refractory insulation member further comprises a ceramic that electrically insulates the hidden thermal energy transfer surface, the thermally capacitive slug, and the temperature reader from the heat flux and incident energy of the high energy arc event.

7. The high energy arc-compatible thermal capacitance sensor of claim 1, wherein a ceramic of the refractory insulation member comprises calcium silicate.

8. The high energy arc-compatible thermal capacitance sensor of claim 1, wherein the thermally capacitive slug further comprises a fastener receiver arranged proximate to the hidden thermal energy transfer surface and that receives a fastener that fastens the temperature reader to the thermally capacitive slug.

9. The high energy arc-compatible thermal capacitance sensor of claim 8, further comprising the fastener disposed in the thermally capacitive slug that is received by the fastener receiver and that that fastens the temperature reader to the thermally capacitive slug.

10. The high energy arc-compatible thermal capacitance sensor of claim 9, wherein the fastener comprises a rivet that mechanically engages the fastener receiver.

11. The high energy arc-compatible thermal capacitance sensor of claim 9, further comprising an electrically insulating spacer interposed between the fastener and the temperature reader.

12. The high energy arc-compatible thermal capacitance sensor of claim 11, wherein the electrically insulating spacer comprises a ceramic paper washer that electrically insulates the fastener and the temperature reader.

13. The high energy arc-compatible thermal capacitance sensor of claim 11, further comprising a mechanical load distributor interposed between the fastener and the electrically insulating spacer.

14. The high energy arc-compatible thermal capacitance sensor of claim 13, wherein the mechanical load distributor comprises a metallic washer that is under mechanical compression by the fastener and the thermally capacitive slug.

15. A high energy arc-compatible thermal capacitance sensor for measuring heat flux and incident energy of a high energy arc event, the high energy arc-compatible thermal capacitance sensor comprising:

a thermally capacitive slug comprising:
    a refractory metal that nondestructively withstands changes in shape, volume, and mass while being subjected to a plasma jet from a high energy arc event for a duration of exposure time of at least 8 seconds and at least 10,000° C. or at least or 8 $MW/m^2$;
    an exposed high energy arc receiver surface that receives heat flux and incident energy from the plasma jet and produces thermal energy from receiving the heat flux and incident energy;
    a hidden thermal energy transfer surface arranged relative to the exposed high energy arc receiver surface so that the hidden thermal energy transfer surface is not exposed to the plasma jet and the heat flux and incident energy and so that the hidden thermal energy transfer surface receives the thermal energy from the exposed high energy arc receiver surface, wherein the thermal energy is communicated from the exposed high energy arc receiver surface to the hidden thermal energy transfer surface through the refractory metal, wherein a refractory insulation member blocks the plasma jet and the heat flux and incident energy from the hidden thermal energy transfer surface;
    a mounting surface that mechanically engages the refractory insulation member such that the mounting surface is interposed between the exposed high energy arc receiver surface and the hidden thermal energy transfer surface, and such that the mounting surface is not exposed to the plasma jet and the heat flux and incident energy by the refractory insulation member that blocks the mounting surface from the plasma jet and the heat flux and incident energy; and
    a fastener receiver arranged proximate to the hidden thermal energy transfer surface and that receives a fastener that fastens the temperature reader to the thermally capacitive slug;

the refractory insulation member in which the thermally capacitive slug is disposed and comprising:
    a ceramic that electrically insulates the hidden thermal energy transfer surface, the thermally capacitive slug, and the temperature reader from the heat flux and incident energy of the high energy arc event;
    a slug receptacle bounded by a receptacle wall and that receives the thermally capacitive slug such that the receptacle wall mechanically engages the mounting surface of the thermally capacitive slug and fixes a position of the mounting surface of the thermally capacitive slug;
    an output interface aperture bounded by an aperture wall and that provides communication between a temperature reader disposed on the hidden thermal energy transfer surface of the thermally capacitive slug and a thermal energy analyzer such that thermal energy data is communicable from the temperature reader to the thermal energy analyzer; and
    a mounting member to mount the high energy arc-compatible thermal capacitance sensor to a support structure;

the temperature reader disposed on the hidden thermal energy transfer surface of the thermally capacitive slug and in thermal communication with the hidden thermal energy transfer surface and that measures a temperature of the hidden thermal energy transfer surface such that the temperature reader:
    comprises a thermocouple, a resistance temperature detector, a thermometer, a thermistor, or a combination comprising at least one of the foregoing temperature readers;
    is not exposed to the plasma jet and the heat flux and incident energy by the refractory insulation member that blocks the temperature reader from the plasma jet and the heat flux and incident energy;
    receives the thermal energy from the hidden thermal energy transfer surface; and
    produces the thermal energy data from the thermal energy such that the heat flux and incident energy of the high energy arc event is determinable from the thermal energy data;

the fastener disposed in the thermally capacitive slug that is received by the fastener receiver and that that fastens the temperature reader to the thermally capacitive slug;

an electrically insulating spacer interposed between the fastener and the temperature reader and that comprises a ceramic paper washer that electrically insulates the fastener and the temperature reader; and a mechanical load distributor interposed between the fastener and the electrically insulating spacer.

16. The high energy arc-compatible thermal capacitance sensor of claim 15, wherein the refractory metal of the thermally capacitive slug comprises tungsten, and the thermally capacitive slug further comprises a cylindrical shape.

17. The high energy arc-compatible thermal capacitance sensor of claim 15, wherein the fastener comprises a rivet that mechanically engages the fastener receiver, and the mechanical load distributor comprises a metallic washer that is under mechanical compression by the fastener and the thermally capacitive slug.

18. The high energy arc-compatible thermal capacitance sensor of claim 15, wherein the ceramic of the refractory insulation member comprises calcium silicate.

19. A process for measuring heat flux and incident energy of a high energy arc event with a high energy arc-compatible thermal capacitance sensor, the process comprising:

receiving, by an exposed high energy arc receiver surface of the high energy arc-compatible thermal capacitance sensor, heat flux and incident energy from a plasma jet of a high energy arc event, the high energy arc-compatible thermal capacitance sensor comprising:

a thermally capacitive slug comprising:

a refractory metal that nondestructively withstands changes in shape, volume, and mass while being subjected to the plasma jet from the high energy arc event for a duration of exposure time of at least 8 seconds and at least 10,000° C. or at least or 8 MW/m²;

the exposed high energy arc receiver surface that receives the heat flux and incident energy from the plasma jet;

a hidden thermal energy transfer surface arranged relative to the exposed high energy arc receiver surface so that the hidden thermal energy transfer surface is not exposed to the plasma jet and the heat flux and incident energy; and a mounting surface that mechanically engages the refractory insulation member such that mounting the surface is interposed between the exposed high energy arc receiver surface and the hidden thermal energy transfer surface, and such that the mounting surface is not exposed to the plasma jet and the heat flux and incident energy by the refractory insulation member, which blocks the mounting surface from the plasma jet and the heat flux and incident energy;

the refractory insulation member in which the thermally capacitive slug is disposed and comprising:

a slug receptacle bounded by a receptacle wall and that receives the thermally capacitive slug such that the receptacle wall mechanically engages the mounting surface of the thermally capacitive slug and fixes a position of the mounting surface of the thermally capacitive slug;

an output interface aperture bounded by an aperture wall and that provides communication between a temperature reader disposed on the hidden thermal energy transfer surface of the thermally capacitive slug and a thermal energy analyzer such that thermal energy data is communicable from the temperature reader to the thermal energy analyzer; and the temperature reader disposed on the hidden thermal energy transfer surface of the thermally capacitive slug and in thermal communication with the hidden thermal energy transfer surface and that measures a temperature of the hidden thermal energy transfer surface such that the temperature reader:

is not exposed to the plasma jet and the heat flux and incident energy by the refractory insulation member that blocks the temperature reader from the plasma jet and the heat flux and incident energy;

receives the thermal energy from the hidden thermal energy transfer surface; and produces the thermal energy data from the thermal energy such that the heat flux and incident energy of the high energy arc event is determinable from the thermal energy data;

producing, by the exposed high energy arc receiver surface, thermal energy from the heat flux and incident energy in response to receiving the heat flux and incident energy from the plasma jet;

blocking, by the refractory insulation member, the plasma jet and the heat flux and incident energy from the hidden thermal energy transfer surface and the mounting surface of the thermally capacitive slug;

communicating the thermal energy from the exposed high energy arc receiver surface to the hidden thermal energy transfer surface through the refractory metal;

receiving, by the hidden thermal energy transfer surface, the thermal energy from the exposed high energy arc receiver surface;

communicating the thermal energy from the hidden thermal energy transfer surface to the temperature reader;

receiving, by the temperature reader, the thermal energy from the hidden thermal energy transfer surface;

producing, by the temperature reader, thermal energy data from the thermal energy; and determining the heat flux and incident energy of the high energy arc event from the thermal energy data.

20. The process of claim 19, wherein determining the heat flux and incident energy comprises:

obtaining the heat flux at the exposed high energy arc receiver surface from $$\dot{q}'' = \rho \cdot \overline{C_P} \cdot l \cdot \left( \frac{\Delta T}{\Delta t} \right)$$

wherein q" is the heat flux received by the exposed high energy arc receiver surface; $\rho$ is the density of the thermally capacitive slug; $\overline{C_p}$ is the average heat capacity of the thermally capacitive slug; l is the thickness of the thermally capacitive slug; $\Delta T$ is the change in temperature of the thermally capacitive slug, and $\Delta t$ is the change in time over which $\Delta T$ is measured by the temperature reader.

* * * * *